US012609855B2

(12) United States Patent
Liu et al.

(10) Patent No.: US 12,609,855 B2
(45) Date of Patent: Apr. 21, 2026

(54) ELECTRONIC DEVICE

(71) Applicant: NTT DOCOMO, INC., Tokyo (JP)

(72) Inventors: Juan Liu, Beijing (CN); Wenjia Liu, Beijing (CN); Xiaolin Hou, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/839,369

(22) PCT Filed: Mar. 10, 2022

(86) PCT No.: PCT/CN2022/080163
§ 371 (c)(1),
(2) Date: Aug. 16, 2024

(87) PCT Pub. No.: WO2023/168656
PCT Pub. Date: Sep. 14, 2023

(65) Prior Publication Data
US 2025/0158868 A1     May 15, 2025

(51) Int. Cl.
H04L 27/26        (2006.01)
(52) U.S. Cl.
CPC ................................. H04L 27/2636 (2013.01)
(58) Field of Classification Search
CPC .................................................... H04L 27/2636
USPC ......................................................... 375/295
See application file for complete search history.

(56) References Cited

U.S. PATENT DOCUMENTS

| 7,889,237 | B2 * | 2/2011 | Okumura | ............... | H04N 23/69 |
| | | | | | 348/240.99 |
| 2014/0197835 | A1 * | 7/2014 | Kamada | ............. | G01R 33/5608 |
| | | | | | 324/309 |

FOREIGN PATENT DOCUMENTS

| CN | 101751375 | A | 6/2010 |
| CN | 109579880 | A | 4/2019 |

OTHER PUBLICATIONS

I. P. Nasarre, T. Levanen, K. Pajukoski, A. Lehti, E. Tiirola and M. Valkama, "Enhanced Uplink Coverage for 5G NR: Frequency-Domain Spectral Shaping With Spectral Extension," in IEEE Open Journal of the Communications Society, vol. 2, pp. 1188-1204, 2021 (17 pages).

(Continued)

*Primary Examiner* — Leila Malek
(74) *Attorney, Agent, or Firm* — Osha Bergman Watanabe & Burton LLP

(57)        ABSTRACT

The present disclosure provides an electronic device, including an input unit configured to obtain a first sequence including Q elements, the Q being an integer greater than 0; a control unit configured to perform a zero-padding operation and a discrete Fourier transformation spreading operation on the first sequence to determine an extension sequence, and perform a double-side data deletion operation based on the extension sequence to determine a second sequence, wherein the second sequence includes M elements, the M being an integer greater than 0.

3 Claims, 5 Drawing Sheets

(56) References Cited

OTHER PUBLICATIONS

J. Liu, W. Liu, X. Hou, Y. Kishiyama, L. Chen, and T. Asai, "Non-Orthogonal Waveform (NOW) for 5G Evolution and 6G", Non-Orthogonal Waveform (NOW) for Beyond 5G Communication Systems, IEEE PIMRC'20 WS (6 pages).
Nokia: "Above 52.6 GHz PHY design", B52.6GHz Waveform Workshop; May 2019 (21 pages).
InterDigital Communications: "Design considerations on waveform in UL for New Radio systems"; 3GPP TSG RAN WG1 Meeting #84bis, R1-162925; Busan, Korea; Apr. 11-15, 2016 (7 pages).

* cited by examiner

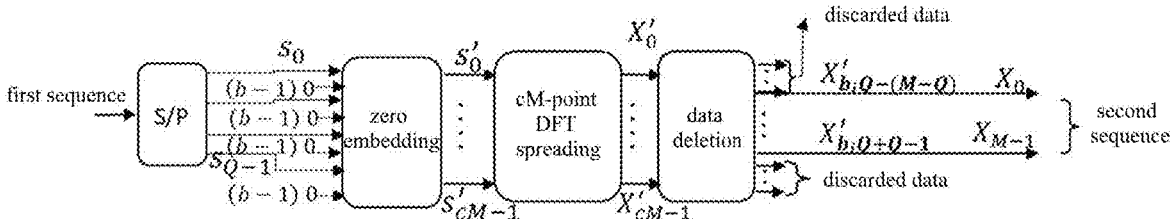
Fig.6A
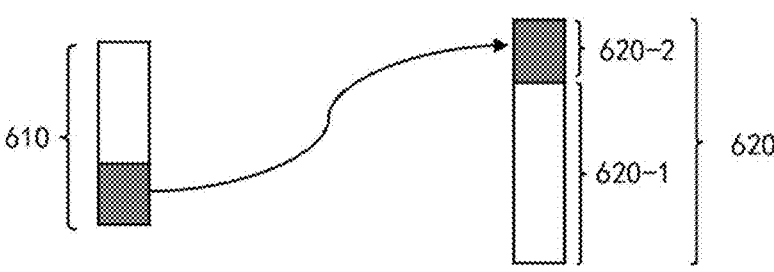
Fig.6B
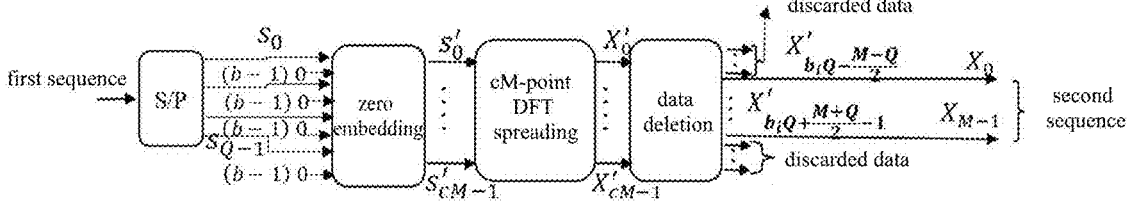
Fig.7A
Fig.7B data processing method 800

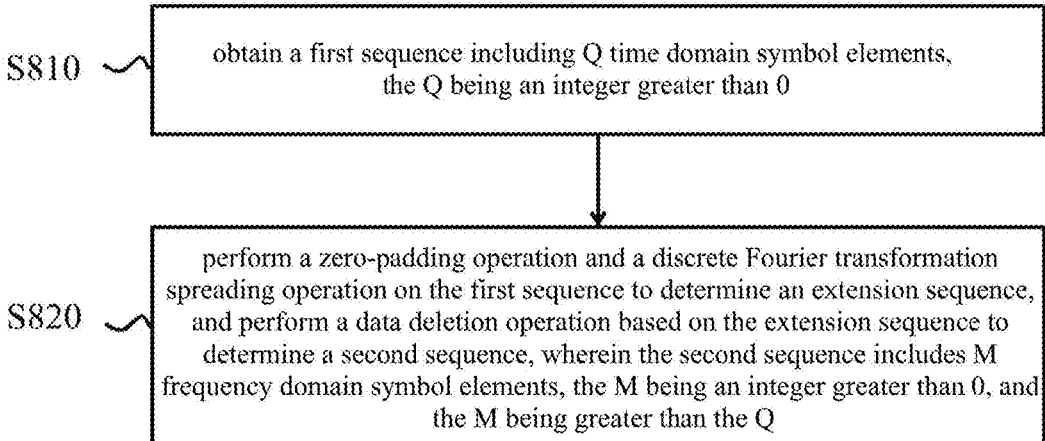

S810 ⟋ obtain a first sequence including Q time domain symbol elements, the Q being an integer greater than 0

S820 ⟋ perform a zero-padding operation and a discrete Fourier transformation spreading operation on the first sequence to determine an extension sequence, and perform a data deletion operation based on the extension sequence to determine a second sequence, wherein the second sequence includes M frequency domain symbol elements, the M being an integer greater than 0, and the M being greater than the Q

Fig.8

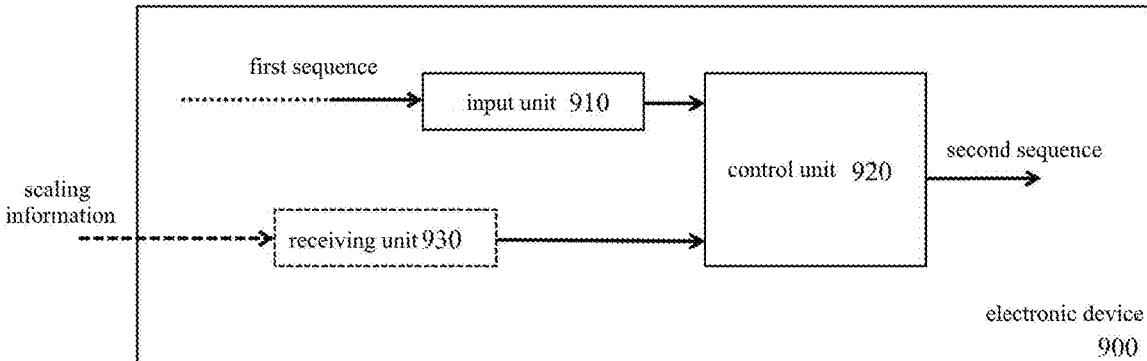

first sequence input unit  910 scaling information receiving unit 930 control unit  920 second sequence electronic device 900

Fig.9 data processing method 1000

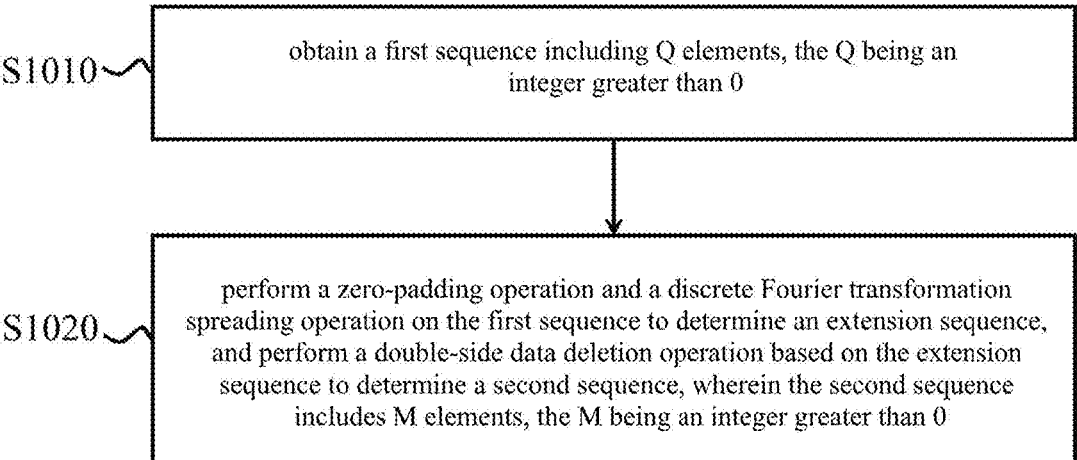

S1010 — obtain a first sequence including Q elements, the Q being an integer greater than 0

S1020 — perform a zero-padding operation and a discrete Fourier transformation spreading operation on the first sequence to determine an extension sequence, and perform a double-side data deletion operation based on the extension sequence to determine a second sequence, wherein the second sequence includes M elements, the M being an integer greater than 0

Fig.10

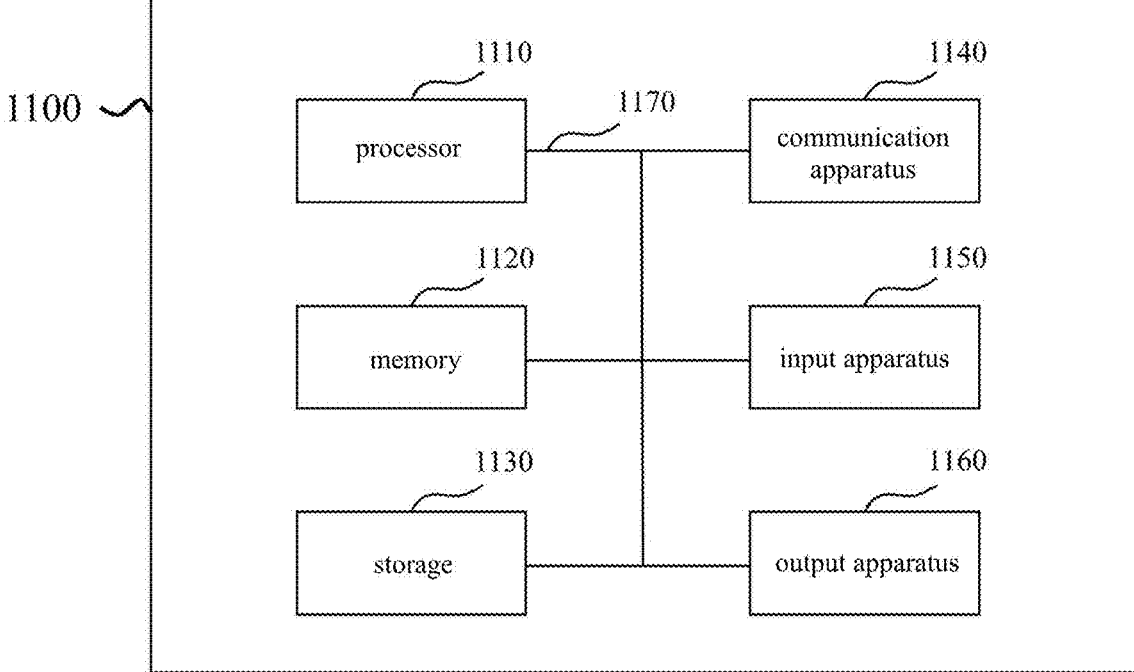

1100

1110 processor

1170

1140 communication apparatus 1120 memory 1150 input apparatus 1130 storage 1160 output apparatus

Fig.11

ELECTRONIC DEVICE

TECHNICAL FIELD

The present disclosure relates to a field of wireless communication, in particular to an electronic device, and more specifically to an electronic device based on a unified non-orthogonal waveform (UNOW) architecture.

BACKGROUND

The future 6G communication system puts forward higher requirements for peak to average power ratio (PAPR) of a waveform. Discrete Fourier Transformation spreading Orthogonal Frequency Division Multiplexing (DFT-s-OFDM), as an existing uplink waveform of 5G system, has a low PAPR and is one of the important candidate waveforms of 6G. However, the current DFT-s-OFDM scheme still cannot meet the requirements of a 5G evolution communication system and a 6G communication system. In addition, the 6G communication system also puts forward higher requirements for out-of-band energy leakage (OOBE) and spectrum efficiency (SE) of a waveform.

At present, many improved schemes based on DFT-s-OFDM have been proposed, for example, an improved scheme based on Null cyclic prefix (NCP) and unique word (UW) and an improved scheme based on frequency domain spectrum shaping (FDSS) have been proposed. Through research, it is found that the improved schemes of the NCP/UW can be summarized as performing pre-processing before a DFT module, while the technical means of the FDSS can be summarized as performing post-processing after the DFT module.

In addition, an improved scheme of DFT-s-OFDM based on Non-Orthogonal waveform (NOW) is further proposed at present. In this scheme, Fast-Than-Nyquist (FTN) modulation is introduced at the back end of Inverse Discrete Fourier Transformation (IFFT) to compress a sampling interval in time domain.

However, the NOW scheme has a problem that it is difficult to be compatible with other existing technologies such as the NCP/UW scheme or the FDSS scheme.

SUMMARY

According to another aspect of the present disclosure, it is desirable to provide an electronic device, so as to achieve a good compatibility with existing improved schemes based on DFT-s-OFDM in a simple manner, and to provide a flexible spectrum transformation mode for a sequence to be transmitted.

According to one aspect of the present disclosure, there is provided an electronic device including: an input unit configured to obtain a first sequence including Q elements, the Q being an integer greater than 0; a control unit configured to perform a zero-padding operation and a discrete Fourier transformation spreading operation on the first sequence to determine an extension sequence, and perform a double-side data deletion operation based on the extension sequence to determine a second sequence, wherein the second sequence includes M elements, the M being an integer greater than 0.

According to one aspect of the present disclosure, there is provided a data processing method, including: an input step configured to obtain a first sequence including Q elements, the Q being an integer greater than 0; a processing step configured to perform a zero-padding operation and a discrete Fourier transformation spreading operation on the first sequence to determine an extension sequence, and perform a double-side data deletion operation based on the extension sequence to determine a second sequence, wherein the second sequence includes M elements, the M being an integer greater than 0.

According to the electronic device and the method in the above one aspect of the present disclosure, it is possible to achieve a good compatibility with existing improved schemes based on DFT-s-OFDM in a simple manner, and to provide a flexible spectrum transformation mode for a sequence to be transmitted.

BRIEF DESCRIPTION OF DRAWINGS

The above and other objects, features and advantages of the present disclosure will become more obvious by describing embodiments of the present disclosure in more detail in conjunction with accompanying drawings. The accompanying drawings are provided to provide a further understanding of the embodiments of the present disclosure, constitute a part of the specification, serve to explain the present disclosure together with the embodiments of the present disclosure, and do not constitute a limitation of the present disclosure. In the drawings, like reference numerals usually represent like components or steps.

FIG. 6A is a schematic diagram showing operations performed by the electronic device 300 according to another embodiment of the present disclosure.

FIG. 6B is a schematic diagram showing a second sequence 620 obtained after processing the first sequence according to a zero-padding operation and a data deletion operation shown in FIG. 6A.

FIG. 7A is a schematic diagram showing operations performed by an electronic device 300 according to another embodiment of the present disclosure.

FIG. 7B is a schematic diagram showing a second sequence 720 obtained after processing the first sequence according to a zero-padding operation and a data deletion operation shown in FIG. 7A.

FIG. 8 is a flowchart showing a data processing method 800 executed by the electronic device 300 according to one embodiment of the present disclosure.

FIG. 9 is a block diagram showing an electronic device 900 according to one embodiment of the present disclosure.

FIG. 10 is a flowchart showing a data processing method 1000 executed by the electronic device 900 according to one embodiment of the present disclosure.

FIG. 11 is a schematic diagram showing a hardware structure of a device 1100 involved according to an embodiment of the present disclosure.

DETAILED DESCRIPTION

Figure 1:
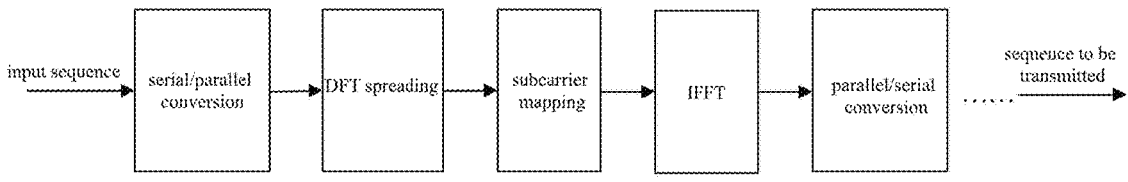
FIG. 1 is a schematic diagram showing a structure of a transmitter adopting a conventional DFT-s-OFDM scheme.

In order to make the objects, technical solutions and advantages of the present disclosure more obvious, exemplary embodiments according to the present disclosure will be described in detail below with reference to the accompanying drawings. Like reference numerals refer to like elements throughout the drawings. It should be appreciated that the embodiments described herein are merely illustrative and should not be construed as limiting the scope of the present disclosure.

The future 6G communication system puts forward higher requirements for peak to average power ratio (PAPR) of a waveform, an out-of-band energy leakage (OOBE) and spectrum efficiency (SE). Discrete Fourier Transformation spreading Orthogonal Frequency Division Multiplexing (DFT-s-OFDM), as an existing uplink waveform of a 5G system, has a low PAPR and is one of important candidate waveforms of a 6G system. However, the current DFT-s-OFDM scheme still cannot meet the requirements of a 5G evolution communication system and a 6G communication system. At present, many improved schemes based on DFT-s-OFDM have been proposed to try to improve the above performances.

For example, a DFT-s-OFDM scheme based on Null cyclic prefix (NCP) has been proposed. The DFT-s-OFDM scheme based on the NCP replaces the traditional cyclic prefix by inserting zero sequence before discrete Fourier transformation (DFT) of data, so as to reduce the OOBE and improve the SE. Similarly, a DFT-s-OFDM scheme based on unique word (UW) has been proposed. The DFT-s-OFDM scheme based on the UW replaces the traditional cyclic prefix by inserting a known sequence before the discrete Fourier transformation (DFT) of the data, so as to reduce the OOBE and improve the SE. For another example, a DFT-s-OFDM scheme based on frequency domain spectral shaping (FDSS) is also proposed. This scheme adjusts correlation and distribution of time domain signals by shaping frequency domain signals to reduce the PAPR.

In addition, a DFT-s-OFDM scheme based on Fast-Than-Nyquis (FTN) modulation is also proposed, which is also called a Non-Orthogonal waveform (NOW) scheme. In this scheme, the compression of time-domain sampling signals is realized by performing a further FTN modulation operation on the DFT-s-OFDM, thereby reducing the PAPR while improving the SE. However, although the DFT-s-OFDM scheme based on the FTN modulation can realize the compression of sampling signals, this scheme needs to insert a cyclic prefix (CP) into a sequence after IFFT operation and parallel/serial conversion operation and perform the FTN modulation on the sequence to realize the compression of sampling signals in time domain, thereby improving the spectral efficiency. That is to say, this scheme does not improve DFT spreading through an operation immediately before or after the DFT spreading, which makes it difficult for this scheme to use a unified structure of a transmitter with enhancement technologies such as the NCP, the UW, the FDSS and so on.

Figure 2:
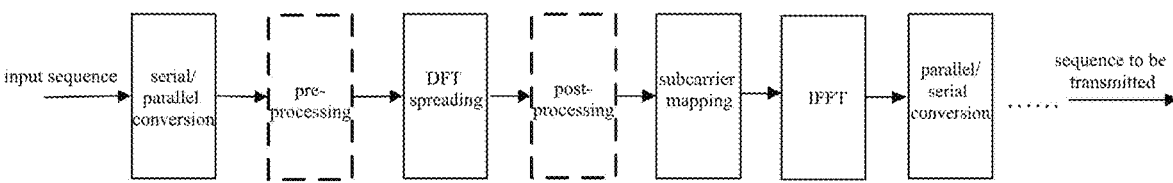
FIG. 2 is a schematic diagram showing a structure of a transmitter supporting a unified processing framework according to aspects of the present disclosure.

FIG. 1 is a schematic diagram showing a structure of a transmitter adopting a conventional DFT-s-OFDM scheme. As shown in FIG. 1, an input sequence is input to a DFT spreading module after serial/parallel conversion to obtain a DFT spreading sequence, and then a subcarrier mapping operation, an inverse discrete Fourier transformation (IFFT) operation and a parallel/serial conversion operation and so on are sequentially performed on the DFT spreading sequence to determine a sequence to be transmitted. FIG. 2 is a schematic diagram showing a structure of a transmitter supporting a unified processing framework according to aspects of the present disclosure. In an embodiment according to the present disclosure, an improved scheme for DFT-s-OFDM may be divided into pre-processing and post-processing of DFT spreading according to whether it is performed before or after the DFT spreading. As shown in FIG. 2, in an embodiment according to the present disclosure, in the process of determining the sequence to be transmitted, the pre-processing and post-processing of the DFT spreading may be added to enhance the DFT-s-OFDM scheme. In an example according to the present disclosure, the pre-processing of the DFT spreading may be an operation before the DFT spreading and immediately before the DFT spreading. The post-processing of the DFT spreading may be an operation after the DFT spreading and immediately after the DFT spreading.

However, the pre-processing and the post-processing of the DFT spreading proposed at present mainly improve the spectral efficiency. Although methods for reducing the PAPR by using such as the FDSS and so on after the post-processing of the DFT spreading are also proposed, the FDSS results in a limited reduction in the PAPR. Therefore, it is desirable to provide a pre-processing and post-processing for the DFT spreading, so as to realize a transformation operation of the frequency spectrum more flexibly.

Figure 3:
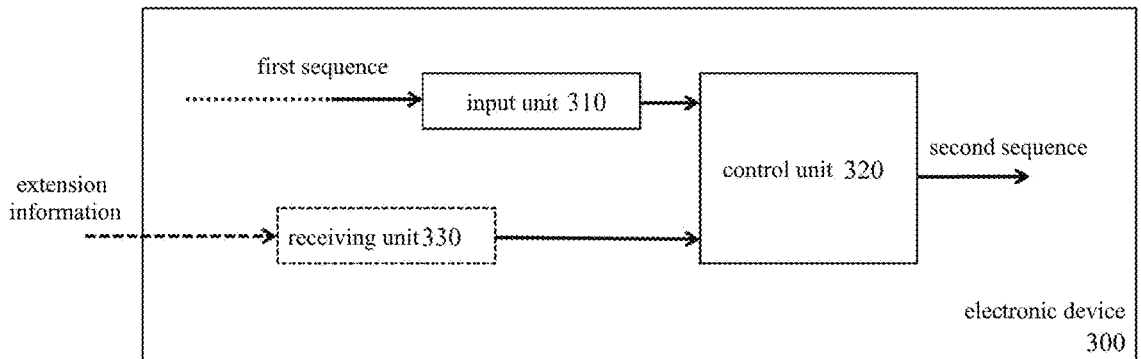
FIG. 3 is a block diagram illustrating an electronic device 300 according to one embodiment of the present disclosure.

Hereinafter, an electronic device 300 according to an embodiment of the present disclosure will be described with reference to FIG. 3. FIG. 3 is a block diagram showing an electronic device 300 according to one embodiment of the present disclosure. In an embodiment of the present disclosure, the electronic device 300 may be a terminal device, such as a cellular phone, a smart phone, a portable computing device, a base station, a relay device, and the like. As shown in FIG. 3, the electronic device 300 includes an input unit 310 and a control unit 320. The electronic device 300 may also include other components (e.g., a storage unit for storing data, etc.), however, since these components have nothing to do with contents of embodiments of the present disclosure, their illustrations and descriptions are omitted here.

As shown in FIG. 3, the input unit 310 may obtain a first sequence including Q elements, the Q being an integer greater than 0. According to an example of the present disclosure, the first sequence may be a data sequence to be transmitted by the electronic device 100, or a combination of the data sequence and another sequence, for example, a combination of the data sequence and a sequence for at least one of NCP and UW.

The input unit 310 may obtain the first sequence from other units included in the electronic device 300 or may obtain the first sequence from other units independent of the electronic device 300.

The control unit 320 may perform a zero-padding operation and a discrete Fourier transformation (DFT) spreading operation on the first sequence to determine an extension sequence. The extension sequence may be a sequence in the frequency domain obtained by performing the DFT spreading on the first sequence after the zero-padding. Then, the control unit 320 may perform a data deletion operation based on the extension sequence to determine a second sequence, wherein the second sequence includes M elements, the M being an integer greater than 0, and the M being greater than the Q. Because there are more elements in the second sequence after the data deletion operation than in the initially input first sequence, a frequency band corresponding to each symbol in the second sequence is wider than a sequence obtained by directly performing the DFT spreading operation on the first sequence, thus realizing the spectrum extension.

According to an example of the present disclosure, when performing the DFT spreading operation, the control unit 320 may perform a N-point DFT spreading operation according to the zero embedding sequence to determine the extension sequence, where N is an integer multiple of M. After the DFT spreading, the control unit 320 may perform a data deletion operation based on the extension sequence to determine a second sequence, wherein the second sequence includes M elements, the M being an integer greater than 0, and the M being greater than the Q.

Figure 4A:
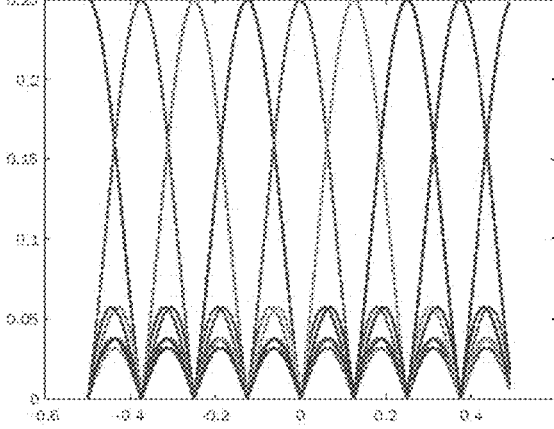
FIG. 4A is a schematic diagram showing time domain pulses of a sequence obtained by directly performing a DFT spreading operation on the first sequence.
Figure 4B:
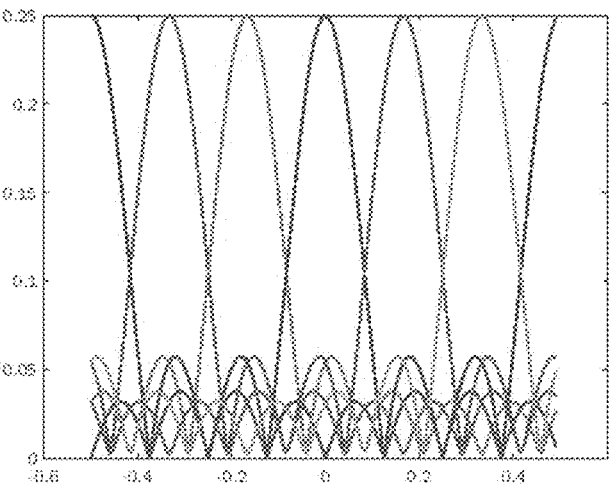
FIG. 4B is a schematic diagram showing time domain pulses of a second sequence.

FIG. 4A is a schematic diagram showing time domain pulses of a sequence obtained by directly performing the DFT spreading operation on the first sequence. FIG. 4B is a schematic diagram showing time domain pulses of the second sequence. As shown in FIG. 4A and FIG. 4B, compared with the sequence obtained by directly performing the DFT spreading operation on the first sequence, a pulse interval between symbols in the second sequence is increased, so that the peaks of higher harmonics of each symbol in the second sequence do not overlap, which makes the in-phase superposition effect be weakened.

According to an example of the present disclosure, the ratio of the M to the Q (hereinafter also referred to as an extension factor) may be preset. Alternatively, extension information about the ratio of the M to the Q may also be received. Furthermore, according to another example of the present disclosure, the value of the M may be determined according to a transmission bandwidth of the electronic device 300, and the value of the Q may be determined according to the preset extension factor. According to an example of the present disclosure, the electronic device 300 may further include a receiving unit 330 (as shown by the dashed box in FIG. 1). The receiving unit 330 may receive the extension information. As an example, the extension information may be notified to the electronic device 300 through any one of Radio Resource Control (RRC) signaling, MAC control element (MAC CE), Downlink Control Information (DCI), etc., so that the receiving unit of the electronic device 300 may receive the above extension information. Compared with the preset ratio of the M to the Q, the control unit 320 may perform at least one of the zero-padding operation and the data deletion operation according to the extension information, thereby performing a more flexible frequency extension operation.

According to an example of the present disclosure, the extension information may indicate information directly related to the extension factor, for example, index information about the value of the extension factor, a bitmap about the value of the extension factor, and the like.

For example, the value of the extension factor may be preset to 1.5. When the extension information is received by the receiving unit 330, the control unit 320 may determine that the value of the extension factor is 1.5. When the extension information is not received by the receiving unit 330, the control unit 320 may determine the value of the extension factor as the default value, and vice versa. In addition, the extension information may also directly indicate the value of the extension factor. For another example, the extension information may also directly indicate that the value of the extension factor is 1.1, 1.3, 1.5, etc. As an example, the value of the extension factor may be indicated by a fixed or configured RRC or MAC CE or DCI parameter (e.g., Spectral-extensionfactor) in the communication standard.

As another example, a set of values of the extension factor may be predefined. For example, the predefined set of the values of the extension factor may be {1.05, 1.1, 1.15, 1.2, 1.25, 1.3, 1.35, 1.4, 1.45, 1.5, 1.55, 1.6, 1.65, 1.7}, where an index of the extension factor 1.05 can be 0, an index of the extension factor 1.1 may be 1, and an index of the extension factor 1.15 may be 2, and the like. Then, the index of the extension factor to be used in the predefined set of the values of the extension factor is indicated by the extension information. For example, through the set RRC or MAC CE or DCI parameter and through the index of the extension factor to be used in the predefined set of the values of the extension factor indicated by this parameter being 4, it is indicated that the value of the extension factor to be used is 1.25. When the above RRC or MAC CE or DCI parameter (e.g., the Spectral-extensionfactor) is not configured, the electronic device 300 may directly set the value of the extension factor as the default extension factor value (e.g., 1).

For another example, a new bitmap may be predefined and a new field (such as SpectralExtensionFactor) may be predefined in the RRC or MAC CE or DCI to indicate the value of the extension factor to be used. For example, the bitmap may be Table 1 and Table 2, which respectively represent different extension factor granularities.

TABLE 1

| SpectralExtensionFactor field | Extension factor |
|---|---|
| 0000 | 1 |
| 0001 | 1.05 |
| 0010 | 1.10 |
| 0011 | 1.15 |
| 0100 | 1.20 |
| 0101 | 1.25 |
| 0110 | 1.30 |
| 0111 | 1.35 |
| 1000 | 1.40 |
| 1001 | 1.45 |
| 1010 | 1.50 |
| 1011 | 1.55 |
| 1100 | 1.60 |
| 1101 | 1.65 |
| 1110 | 1.70 |
| 1111 | 1.75 |

TABLE 2

| SpectralExtensionFactor field | Extension factor |
|---|---|
| 000 | 1 |
| 001 | 1.05 |
| 010 | 1.15 |
| 011 | 1.25 |
| 100 | 1.35 |
| 101 | 1.45 |
| 110 | 1.55 |
| 111 | 1.65 |

As an example, with respect to Table 1, when the value of the SpectralExtensionFactor, a new field predefined in the RRC or MAC CE or DCI is 0010, it represents that the value of the extension factor indicated at this time is 1.10.

As another example, with respect to Table 2, when the value of the SpectralExtensionFactor, a new field predefined in the RRC or MAC CE or DCI, is 110, it is indicated that the value of the extension factor indicated at this time is 1.55.

Indicating the information directly related to the extension factor through the extension information may save signaling overhead while realizing the flexible spectrum extension.

Alternatively, the extension information may indicate information about an extension parameter. The processing unit 320 may determine the extension factor through the extension parameter. According to an example of the present disclosure, the extension information may indicate at least one of a first extension parameter and a second extension parameter, wherein a ratio of the first extension parameter to the second extension parameter is equal to the ratio of the M to the Q. Further, when the extension information indicates one of the first extension parameter and the second extension parameter, the other of the first extension parameter and the second extension parameter is a default value.

As an example, if the first extension parameter is set to b and the second extension parameter is set to c, then the values of b and c to be used may be indicated by two RRC or MAC CE or DCI parameters (e.g. Extension-b and Extension-c) (i.e. the extension information) fixed or configured in the communication standard. As another example, when the above two RRC or MAC CE or DCI parameters (e.g., the Extension-b and the Extension-c) are not configured, the electronic device 100 may directly set both b and c as a default parameter value (e.g., 1). Similar to indicating information directly related to the extension factor through the extension information, the extension information may directly indicate a value of at least one of the first extension parameter and the second extension parameter, or indicate index information, bitmap, etc. about at least one of the first extension parameter and the second extension parameter.

For example, the second extension parameter c may be a specific value predefined in the communication standard, and the first extension parameter b may indicate the value of b to be used through the RRC or MAC CE or DCI parameter (e.g., the Extension-b) (i.e., the extension information) configured in the communication standard. As another example, when the above RRC or MAC CE or DCI parameters (e.g., Extension-b) are not configured, the electronic device 100 can directly set the value of b as a default value, such as the value of c.

For another example, the second extension parameter c may be a specific value predefined in the communication standard. A set of values of the first extension parameter b may be predefined. For example, the predefined set of values of the first extension parameter b may be a first set {30, 29, 28, 27, 26, 25, 24, 23, 22, 21, 20}, where an index with a b value of 30 may be 0, an index with a b value of 29 may be 1, an index with a b value of 28 may be 2, and so on, and at this time, the second extension parameter c can be predefined as 20. For another example, the predefined set of values of the first extension parameter b may be a second set {15, 14, 13, 12, 11, 10}, where an index with a b value of 15 may be 0, an index with a b value of 14 may be 1, an index with a b value of 13 may be 2, and so on, and at this time, the second extension parameter c may be predefined as 10. Then, the index of b to be used in the predefined set of values of b is indicated by a RRC or MAC CE or DCI parameter (such as Extension-b). For example, if the index of b to be used in the predefined set of values of b indicated by the parameter Extension-b is 2, it means that the value of b to be used is 28 (for the first set) or 13 (for the second set). When the above RRC or MAC CE or DCI parameter (e.g., Extension-b) is not configured, the electronic device 100 may directly set the value of b as a default value, such as the value of c.

For another example, two new bitmaps may be predefined and the values of the first extension parameter b and the second extension parameter c to be used may be indicated by predefining new fields (such as "Extensionb scaling" and "Extensionc scaling") in the RRC or MAC CE or DCI. For example, the predefined new bitmap for the first extension parameter b is shown in Table 3 below, and the predefined new bitmap for the second extension parameter c is shown in Table 4 below.

TABLE 3

| Extensionb field | b |
|---|---|
| 0000 | 29 |
| 0001 | 27 |
| 0010 | 25 |
| 0011 | 23 |
| 0100 | 21 |
| 0101 | 13 |
| 0110 | 11 |
| 0111 | 7 |
| 1000 | 6 |
| 1001 | 3 |
| 1010 | 1 |

TABLE 4

| Extensionc field | c |
|---|---|
| 000 | 20 |
| 001 | 10 |
| 010 | 5 |
| 011 | 4 |
| 100 | 2 |
| 101 | 1 |

When the value of the Extensionb and the value of the Extensionc predefined in RRC or MAC CE or DCI are 0010 and 100 respectively, it represents that the indicated value of the first extension parameter b is 25 and the indicated value of the second extension parameter c is 2 at this time.

As another example, a new bitmap may be predefined and the values of the first extension parameter b and the second extension parameter c to be used may be indicated by predefining a new field (such as "Extensionbc scaling") in the RRC or MAC CE or DCI. For example, the predefined new bitmaps for the first extension parameter b and the second extension parameter c are shown in Table 5 below.

TABLE 5

| Extensionbc field | b | c |
|---|---|---|
| 0000 | 1 | 1 |
| 0001 | 21 | 20 |
| 0010 | 11 | 10 |
| 0011 | 23 | 20 |
| 0100 | 6 | 5 |
| 0101 | 5 | 4 |
| 0110 | 13 | 10 |
| 0111 | 27 | 20 |
| 1000 | 7 | 5 |
| 1001 | 29 | 20 |
| 1010 | 3 | 2 |
| 1011 | 31 | 20 |
| 1100 | 8 | 5 |
| 1101 | 33 | 20 |
| 1110 | 17 | 10 |
| 1111 | 7 | 4 |

When the value of the new field Extensionbc predefined in RRC or MAC CE or DCI is 1011, it represents that the indicated value of the first extension parameter b is 31 and the indicated value of the second extension parameter c is 20 at this time.

In addition, the above extension factor may be set to a. As mentioned above, the α may b e set to be $$\alpha = \frac{M}{Q}.$$

In addition, the α may also be set to be $$\alpha = \frac{b}{c},$$

where b≥c, and b and c are positive integers. As described below, the first extension parameter b and the second extension parameter c may be used for the zero-padding operation, the DFT spreading and the data deletion operation. For example, the b may be related to the number of zeros filled in the zero-padding operation. The c may be related to the number of DFT spreading subsets described below, and it may also be related to the number of sampling points of DFT spreading sets. Therefore, compared with indicating the information directly related to the extension factor through the extension information, indicating the information about the extension parameters through the extension information may require more signaling overhead, but it is not necessary to determine the b and the c respectively according to the extension factor, thus simplifying the operation of the electronic device.

According to an embodiment of the present disclosure, the receiving unit 330 may be configured to receive an indication of whether the above data deletion operation being a single-side data deletion operation or a double-side data deletion operation, so that, when the control unit 320 performs the data deletion operation based on the extension sequence to determine the second sequence, it can determine, according to the indication, whether to perform the single-side data deletion operation or the double-side data deletion operation based on the extension sequence to determine the second sequence.

As an example, an indication of whether the above data deletion operation being the single-side data deletion operation or the double-side data deletion operation may be notified to the electronic device 300 through any one of the RRC, MAC CE, DCI, etc., so that the receiving unit of the electronic device 300 may receive the above indication.

As an example, the above indication information may be carried by a predefined bit in any one of the RRC, MAC CE, DCI, etc. For example, the above indication information is carried using the predefined one-bit data in the RRC. For example, when the value of the one-bit data is 0, it may represent the single-side data deletion operation; When the value of the one-bit data is 1, it may represent the double-side data deletion operation.

As another example, the above indication information is carried by the value of $b_i$ described below with respect to FIG. 7A. For example, when the value of $b_i$ is 0, it may represent the single-side data deletion operation; When the value of b; is 1, it may represent the double-side data deletion operation Through determining whether the data deletion operation is the single-side data deletion operation or the double-side data deletion operation according to the above instruction, the mode of the data deletion operation may be determined flexibly, thereby realizing a more flexible spectrum extension operation.

In an embodiment of the present disclosure, the control unit 320 may perform the single-side data deletion operation or the double-side data deletion operation based on the extension sequence to determine the second sequence. This will be described in detail with reference to FIGS. 5A to 7B, and will not be repeated here.

The electronic device according to embodiments of the present disclosure may perform the zero-padding operation and the single-side data deletion operation or the double-side data deletion operation according to the extension information. Hereinafter, operations performed by the input unit 310 and the control unit 320 when the zero-padding operation and the single-side data deletion operation are performed according to the above extension information will be described with reference to FIGS. 5A and 5B. Operations performed by the input unit 310 and the control unit 320 when the zero-padding operation and the double-side data deletion operation are performed according to the above extension information will be described with reference to FIGS. 6A to 7B.

Figure 5A:
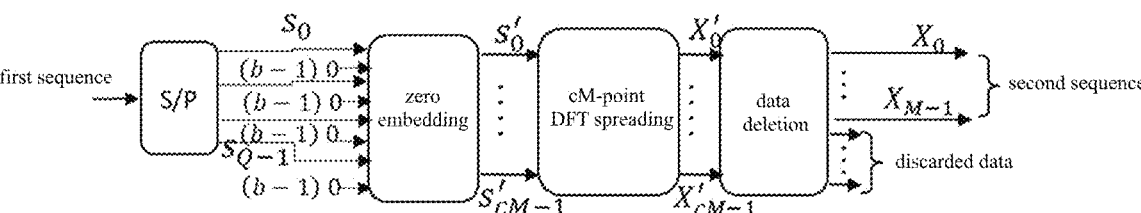
FIG. 5A is a schematic diagram showing operations performed by the electronic device 300 according to one embodiment of the present disclosure.

FIG. 5A is a schematic diagram illustrating operations performed by the electronic device 300 according to one embodiment of the present disclosure. In FIG. 5A, the control unit 320 may first perform the zero-padding operation on the first sequence according to the extension information to determine a zero embedding sequence. As shown in FIG. 5A, in the zero-padding operation, the control unit 320 pads $b_{-1}$ zeros in each element in the first sequence $s = [s_0 \ldots s_i \ldots s_{Q-1}]$ including Q elements, thereby obtaining a zero embedding sequence $s' = [s_0' \ldots s_i' \ldots s_{cM-1}']^T$. In addition, other zero-padding methods may be selected according to actual needs. Therefore, the ith element $s_i'$ in the zero embedding sequence $s' = [s_0' \ldots s_i' \ldots s_{cM-1}']_T$ may also be expressed by formula (1).

$$s_i' = \begin{cases} s_{i/b}, & i \in \{0, b, \ldots, b(Q-1)\} \\ 0, & i \notin \{0, b, \ldots, b(Q-1)\} \end{cases} \tag{1}$$

Therefore, the first sequence $s = [s_0 \ldots s_i \ldots s_{Q-1}]$ including Q elements becomes a zero embedding sequence $s' = [s_0' \ldots s_i' \ldots s_{cM-1}']^T$ including M×c elements after the zero-padding operation.

Then, the control unit 320 may perform the DFT spreading operation through a single cM-point DFT set to determine the extension sequence. For example, as shown in FIG. 5A, a cM-point DFT spreading operation may be performed on the zero embedding sequence $s' = [s_0' \ldots s_i' \ldots s_{cM-1}']^T$, and $X' = [X_0' \ldots X_i' \ldots X_{cM-1}']^T$ may be obtained, where $0 \le i \le cM-1$, wherein it may be set as $$Q = \left\lfloor \frac{c}{b} M \right\rfloor.$$

The relationship between a DFT spreading sequence X' and the zero embedding sequence s' may be shown by formula (2).

$$X' = F^{cM} s' \tag{2}$$

where $F^{cM}$ is a cM-point DFT matrix.

Then, the control unit 320 may perform the single-side data deletion operation according to the determined extension sequence (that is, discard some data in the DFT spreading sequence) to determine the second sequence. For example, as shown in FIG. 5A, the $X_0$'th to the $X_{M-1}$'th elements in the DFT spreading sequence X' are retained and the subsequent elements in the DFT spreading sequence are deleted, to determine the second sequence $X=[X_0 \ldots X_i \ldots X_{M-1}]^T$, $0 \le i \le M-1$. For example, for the ith element in the second sequence X, it may be calculated by formula (3) as follows, where $0 \le i \le M-1$.

$$X_i = X_i' = \frac{1}{\sqrt{M}} \sum_{m=0}^{cM-1} s_m' e^{-\frac{j2\pi im}{cM}} = \frac{1}{\sqrt{M}} \sum_{m=0}^{Q-1} s_m e^{-j2\pi i\left(\frac{b}{c}m\right)}{M}} \qquad (3)$$

After the processing of the above formula (3), the deletion operation is performed on data from a single side, some duplicate data are deleted, and the relative integrity of the data is maintained.

Thus, the control unit 320 obtains the second sequence $X=[X_0 \ldots X_i \ldots X_{M-1}]^T$ including M elements greater than Q based on the first sequence $s=[s_0 \ldots s_i \ldots s_{Q-1}]^T$ including Q elements. Compared with the existing schemes, according to the electronic device of embodiments of the present disclosure, the single-side extension is realized in the frequency domain for the sequence obtained by the zero-padding operation and the data deletion operation shown in FIG. 5A, relative to the sequence obtained by the first sequence directly through the discrete Fourier transformation spreading operation.

Figure 5B:
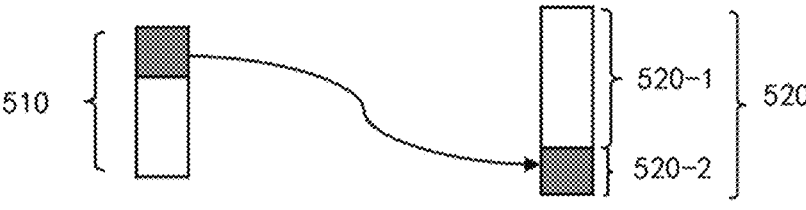
FIG. 5B is a schematic diagram showing a second sequence 520 obtained after processing the first sequence according to a zero-padding operation and a data deletion operation shown in FIG. 5A.

FIG. 5B is a schematic diagram showing a second sequence 520 obtained after processing the first sequence according to the zero-padding operation and the data deletion operation shown in FIG. 5A. As shown in FIG. 5B, the second sequence 520 includes a sequence 520-1 corresponding to an entire data sequence 510 and further includes a sequence 520-2 corresponding to a gray part in the data sequence 510. In other words, the gray part in frequency domain data 510 corresponding to the first sequence is included twice in the second sequence 520.

In the example described above in connection with FIG. 5A and FIG. 5B, the single-side extension of the spectrum is realized by performing the data deletion on $X_M'$ and elements after $X_M'$ in the extension sequence. Alternatively, the data deletion may also be performed in other ways to achieve more flexible spectrum extension as needed.

FIG. 6A is a schematic diagram showing operations performed by an electronic device 300 according to another embodiment of the present disclosure. In FIG. 6A, similar to FIG. 5A, the control unit 320 may first perform the zero-padding operation on the first sequence according to the extension information to determine the zero embedding sequence. As shown in FIG. 6A, in the zero-padding operation, the control unit 320 pads $b-1$ zeros in each element in the first sequence $s=[s_0 \ldots s_i \ldots s_{Q-1}]^T$ including Q elements, thereby obtaining a zero embedding sequence $s'=[s_0' \ldots s_i' \ldots s_{cM-1}]^T$. In addition, other zero-padding methods may be selected according to actual needs. Therefore, the ith element $s_i'$ in the zero embedding sequence $s'=[s_0' \ldots s_i' \ldots s_{cM-1}]^T$ may also be expressed by formula (4).

$$s_i' = \begin{cases} s_{i/b}, & i \in \{0, b, \ldots, b(Q-1)\} \\ 0, & i \notin \{0, b, \ldots, b(Q-1)\} \end{cases} \qquad (4)$$

Therefore, the first sequence $s=[s_0 \ldots s_i \ldots s_{Q-1}]^T$ including Q elements becomes a zero embedding sequence $s'=[s_0' \ldots s_i' \ldots s_{cM-1}]^T$ including M×c elements after the zero-padding operation.

Then, the control unit 320 may perform the DFT spreading operation through a single cM-point DFT set to determine the extension sequence. For example, as shown in FIG. 6A, a cM-point DFT spreading operation may be performed on the zero embedding sequence $s'=[s_0' \ldots s_i' \ldots s_{cM-1}]^T$, and $X'=[X_0' \ldots X_i' \ldots X_{cM-1}']^T$ may be obtained, where $0 \le i \le cM-1$, wherein it may be set that $$Q = \left\lfloor \frac{c}{b} M \right\rfloor.$$

The relationship between a DFT spreading sequence X' and the zero embedding sequence s' may be shown by formula (5).

$$X' = F^{cM} s' \qquad (5)$$

where $F^{cM}$ is a cM-point DFT matrix.

Then, the control unit 320 may perform the double-side data deletion operation according to the determined extension sequence (that is, discard some data in the DFT spreading sequence) to determine the second sequence. For example, as shown in FIG. 6A, the $X_{b_iQ-(M-Q)}$'th to the $X_{b_iQ+Q-1}$'th elements in the DFT spreading sequence X' are retained and the elements before $X_{b_iQ-(M-Q)}'$ and after $X_{b_iQ+Q-1}'$ in the DFT spreading sequence are deleted, to determine the second sequence $X=[X_0 \ldots X_i \ldots X_{M-1}]^T$, $0 \le i \le M-1$. For example, for the ith element in the second sequence X, it may be calculated by formula (6) as follows, where $0 \le i \le M-1$, and $1 \le b_i \le b-2$.

$$X_i = X_{i+(b_iQ-(M-Q))}' = \frac{1}{\sqrt{M}} \sum_{m=0}^{cM-1} s_m' e^{-\frac{j2\pi[i+(b_iQ-(M-Q))]m}{cM}} = \qquad (6)$$

$$\frac{1}{\sqrt{M}} \sum_{m=0}^{Q-1} s_m e^{-\frac{j2\pi[i+(b_iQ-(M-Q))]\left(\frac{b}{c}m\right)}{M}}$$

After the processing of the above formula (6), the deletion operation is performed on data from double sides, some duplicate data are deleted, and the relative integrity of the data is maintained.

Thus, the control unit 320 obtains the second sequence $X=[X_0 \ldots X_i \ldots X_{M-1}]^T$ including M elements greater than Q based on the first sequence $s=[s_0 \ldots s_i \ldots s_{Q-1}]^T$ including Q elements. Compared with the existing schemes, according to the electronic device of embodiments of the present disclosure, the single-side extension is realized in the frequency domain for the sequence obtained by the zero-padding operation and the data deletion operation shown in FIG. 6A, relative to the sequence obtained by the first sequence directly through the discrete Fourier transformation spreading operation.

FIG. 6B is a schematic diagram showing a second sequence 620 obtained after processing the first sequence according to the zero-padding operation and the data deletion operation shown in FIG. 6A. In FIG. 6B, a sequence 610 is a data sequence obtained by only performing the DFT spreading and not performing the zero-padding operation and the data deletion operation on the first sequence. As shown in FIG. 6B, the second sequence 620 includes a sequence 620-1 corresponding to the entire data sequence 610 and a sequence 620-2 corresponding to a gray part in the data sequence 610. In other words, the gray part in frequency domain data 610 corresponding to the first sequence is included twice in the second sequence 620.

In the example described above in connection with FIGS. 6A and 6B, the extension of the spectrum at the other side opposite to FIGS. 5A and 5B is realized by performing the data deletion on elements before $X_{b_iQ-(M-Q)}'$ and elements after $X_{b_iQ+Q-1}'$ in the extension sequence.

FIG. 7A is a schematic diagram showing operations performed by an electronic device 300 according to another embodiment of the present disclosure. In FIG. 7A, similar to FIG. 5A, the control unit 320 may first perform the zero-padding operation on the first sequence according to the extension information to determine the zero embedding sequence. As shown in FIG. 7A, in the zero-padding operation, the control unit 320 pads b−1 zeros in each element in the first sequence s=[$s_0 \ldots s_i \ldots s_{Q-1}$] including Q elements, thereby obtaining a zero embedding sequence s'=[$s_0' \ldots s_i' \ldots s_{cM-1}'$]$^T$. In addition, other zero-padding methods may be selected according to actual needs. Therefore, the ith element $s_i'$ in the zero embedding sequence s'=[$s_0 \ldots s_i \ldots s_{cM-1}$]$^T$ may also be expressed by formula (7).

$$s_i' = \begin{cases} s_{i/b}, & i \in \{0, b, \ldots, b(Q-1)\} \\ 0, & i \in \{0, b, \ldots, b(Q-1)\} \end{cases} \quad (7)$$

Therefore, the first sequence s=[$s_0 \ldots s_i \ldots s_{Q-1}$]$^T$ including Q elements becomes a zero embedding sequence s'=[$s_0' \ldots s_i' \ldots s_{cM-1}'$]$^T$ including M×c elements after the zero-padding operation.

Then, the control unit 320 may perform the DFT spreading operation through a single cM-point DFT set to determine the extension sequence. For example, as shown in FIG. 7A, a cM-point DFT spreading operation may be performed on the zero embedding sequence s'=[$s_0' \ldots s_i' \ldots s_{cM-1}'$]$^T$, and X'=[$X_0' \ldots X_i' \ldots X_{cM-1}'$]$^T$ may be obtained, where 0≤i≤cM−1, wherein it may be set that $$Q = \left\lfloor \frac{c}{b} M \right\rfloor.$$

The relationship between a DFT spreading sequence X' and the zero embedding sequence s' may be shown by formula (8).

$$X' = F^{cM} s' \quad (8)$$

where $F^{cM}$ is a cM-point DFT matrix.

Then, the control unit 320 may perform the double-side data deletion operation according to the determined extension sequence (that is, discard some data in the DFT spreading sequence) to determine the second sequence. For example, as shown in FIG. 7A, the $$X_{b_iQ-\frac{M-Q}{2}}' th$$

to the $$X_{b_iQ+\frac{M+Q}{2}-1}'$$

th elements in the DFT spreading sequence X' are retained and the elements before $$X_{b_iQ-\frac{M-Q}{2}}'$$

and after $$X_{b_iQ+\frac{M+Q}{2}-1}'$$

in the DFT spreading sequence are deleted, to determine the second sequence X=[$X_0 \ldots X_i \ldots X_{M-1}$]$^T$, 0≤i≤M−1. For example, for the ith element in the second sequence X, it may be calculated by formula (9) as follows, where 0≤i≤M−1, and 1≤$b_i$≤b−2.

$$X_i = X_{i+\left(b_iQ-\frac{M-Q}{2}\right)}' = \frac{1}{\sqrt{M}} \sum_{m=0}^{cM-1} s_m' e^{-\frac{j2\pi\left[i+\left(b_iQ-\frac{M-Q}{2}\right)\right]m}{cM}} = \quad (9)$$

$$\frac{1}{\sqrt{M}} \sum_{m=0}^{Q-1} s_m e^{-\frac{j2\pi\left[i+\left(b_iQ-\frac{M-Q}{2}\right)\right]\left(\frac{b}{c}m\right)}{M}}$$

After the processing of the above formula (9), the deletion operation is performed on data from double sides, some duplicate data are deleted, and the relative integrity of the data is maintained.

Thus, the control unit 320 obtains the second sequence X=[$X_0 \ldots X_i \ldots X_{M-1}$]$^T$ including M elements greater than Q based on the first sequence s=[$s_0 \ldots s_i \ldots s_{Q-1}$]' including Q elements. Compared with the existing schemes, according to the electronic device of embodiments of the present disclosure, the double-side extension is realized in the frequency domain for the sequence obtained by the zero-padding operation and the data deletion operation shown in FIG. 7A, relative to the sequence obtained by the first sequence directly through the discrete Fourier transformation spreading operation.

FIG. 7B is a schematic diagram showing a second sequence 720 obtained after processing the first sequence according to the zero-padding operation and the data deletion operation shown in FIG. 7A. In FIG. 7B, a sequence 710 is a data sequence obtained by only performing the DFT spreading and not performing the zero-padding operation and the data deletion operation on the first sequence. As shown in FIG. 7B, the second sequence 720 includes a sequence 720-3 corresponding to the entire data sequence 710, a sequence 720-1 corresponding to a light gray part 710-1 in the data sequence 710 and a sequence 720-2 corresponding to a black part 710-2 in the data sequence 710. In other words, the light gray part and the black part in frequency domain data 710 corresponding to the first sequence are included twice in the second sequence 720.

In the example described above in connection with FIGS. 7A and 7B, the double-side extension of the spectrum is realized by performing the data deletion on elements before $$X'_{b_i Q - \frac{M-Q}{2}}$$

and elements after $$X'_{b_i Q + \frac{M+Q}{2} - 1}$$

in the extension sequence.

In addition, according to another example of the present disclosure, the control unit 320 may also perform subcarrier mapping and inverse discrete Fourier transformation according to the second sequence to determine a sequence to be transmitted. For example, in the example shown in FIG. 2, a subcarrier mapping operation, an inverse discrete Fourier transformation (IFFT) operation, a parallel/serial conversion operation and the like are sequentially performed on the second sequence $X=[X_0 \ldots X_i \ldots X_{M-1}]^T$ to determine the sequence to be transmitted.

In addition, according to another example of the present disclosure, the control unit 320 may also perform the par-allel-serial conversion operation and cyclic prefix insertion (CP insertion) based on the sequence to be transmitted according to a specific situation. The control unit 320 may also perform a serial-parallel operation on a data sequence of the first sequence as an input before the zero-padding operation according to a specific situation, so as to facilitate the zero-padding operation.

According to another example of the present disclosure, the electronic device 300 may further include a transmitting unit (not shown), which may be configured to transmit capability information indicating an extension capability supported by the electronic device. The electronic device 300 may transmit capability information about the extension capability supported by the electronic device through RRC or MAC CE or Uplink Control Information, UCI). Thus, in the case where the electronic device 300 is, for example, a terminal device, a network-side device (for example, a base station) may transmit appropriate extension information to the electronic device 300 according to the electronic device 300.

As an example, the capability information may indicate that the electronic device 300 supports operations related to the extension factor described above. The electronic device 300 may transmit the above capability information through capability signaling. According to an actual situation, the electronic device 300 may also not transmit the capability information in a default case, which may mean that the electronic device 300 supports the operations related to the above extension factor by default, or it may mean that the electronic device 300 does not support the operations related to the extension factor by default. In addition, alternatively, the electronic device 300 may selectively transmit the above capability information according to the actual situation.

As another example, the electronic device 300 may transmit capability information indicating the extension capability supported by the electronic device separately for different frequency bands, or transmit capability information indicating the extension capability supported by the electronic device together for different frequency bands.

In the embodiment of the present disclosure, the electronic device 300 may receive the extension information and perform the zero-padding operation, the discrete Fourier transformation spreading operation, the data deletion operation and other operations after transmitting the capability information about the extension capability supported by the electronic device.

Therefore, by performing the zero-padding operation on the first sequence including Q elements before the DFT spreading operation and performing the data deletion operation after the DFT spreading operation, it is possible to easily realize that a good compatibility with the existing improved scheme based on the DFT-s-OFDM is realized on the basis of the existing scheme compatible with improved schemes based on DFT-s-OFDM in a simple way, and reducing the PAPR while reducing ISI.

Next, a data processing method according to an embodiment of the present disclosure will be described with reference to FIG. 8.

Hereinafter, FIG. 8 is a flowchart showing a data processing method 800 executed by the electronic device 300 according to one embodiment of the present disclosure. Since the steps of the data processing method 800 executed by the electronic device 300 correspond to the operations of the electronic device 300 described above with reference to FIGS. 1 to 7B, a detailed description of the same content is omitted here for the sake of simplicity.

As shown in FIG. 8, the data processing method 800 executed by the electronic device 300 includes an input step S810 and a processing step S820.

Specifically, in the example shown in FIG. 8, in the input step S810, it is configured to obtain a first sequence including Q elements, the Q being an integer greater than 0. According to an example of the present disclosure, the first sequence may be a data sequence to be transmitted by the electronic device 100, or a combination of the data sequence and another sequence, for example, a combination of the data sequence and a sequence for at least one of NCP and UW.

As an example, the first sequence may be obtained from other units included in the electronic device 300 or may be obtained from other units independent of the electronic device 300.

In processing step S820, it is configured to perform a zero-padding operation and a discrete Fourier transformation (DFT) spreading operation on the first sequence to determine an extension sequence, and perform a data deletion operation based on the extension sequence to determine a second sequence, wherein the second sequence includes M elements, the M being an integer greater than 0, and the M being greater than the Q. Because there are more elements in the second sequence after the data deletion operation than in the initially input first sequence, a frequency band corresponding to each symbol in the second sequence is wider than a sequence obtained by directly performing the DFT spreading operation on the first sequence, thus realizing the spectrum extension.

According to an example of the present disclosure, when performing the DFT spreading operation, a N-point DFT spreading operation may be performed according to the zero embedding sequence to determine the extension sequence, where N is an integer multiple of M. After the DFT spreading, a data deletion operation may be performed based on the extension sequence to determine a second sequence, wherein the second sequence includes M elements, the M being an integer greater than 0, and the M being greater than the Q.

According to an example of the present disclosure, the ratio of the M to the Q (hereinafter also referred to as an extension factor) may be preset. Alternatively, extension information about the ratio of the M to the Q may also be received. Furthermore, according to another example of the present disclosure, the value of the M may be determined according to a transmission bandwidth of the electronic device 300, and the value of the Q may be determined according to the preset extension factor.

According to an example of the present disclosure, the data processing method 800 may further include receiving extension information. As an example, the extension information may be received through any one of Radio Resource Control (RRC) signaling, MAC control element (MAC CE), Downlink Control Information, DCI), and the like. Compared with the preset ratio of the M to the Q, at least one of the zero-padding operation and the data deletion operation may be performed accord to the extension information, thereby performing a more flexible frequency extension operation.

According to an example of the present disclosure, the extension information may indicate information directly related to the extension factor, for example, index information about the value of the extension factor, a bitmap about the value of the extension factor, and the like.

Alternatively, the extension information may indicate information about an extension parameter, so that the extension factor may be determined through the extension parameter. According to an example of the present disclosure, the extension information may indicate at least one of a first extension parameter and a second extension parameter, wherein a ratio of the first extension parameter to the second extension parameter is equal to the ratio of the M to the Q. Further, when the extension information indicates one of the first extension parameter and the second extension parameter, the other of the first extension parameter and the second extension parameter is a default value.

Compared with indicating the information directly related to the extension factor through the extension information, indicating the information about the extension parameter through the extension information may require more signaling overhead, but it is not necessary to determine b and c respectively according to the extension factor, thereby simplifying the operations of electronic device.

According to an example of the present disclosure, the data processing method 800 may further include receiving an indication of whether the above data deletion operation being a single-side data deletion operation or a double-side data deletion operation, so that, when the data deletion operation is performed based on the extension sequence to determine the second sequence in step S820, it can determine, according to the indication, whether to perform the single-side data deletion operation or the double-side data deletion operation based on the extension sequence to determine the second sequence.

As an example, the indication of whether the above data deletion operation being the single-side data deletion operation or the double-side data deletion operation may be received through any one of the RRC, MAC CE, DCI, and the like.

Through determining whether the data deletion operation is the single-side data deletion operation or the double-side data deletion operation according to the above indication, the mode of the data deletion operation may be determined flexibly, thereby realizing a more flexible spectrum extension operation.

According to an example of the present disclosure, the data processing method 800 may further include transmitting capability information indicating an extension capability supported by the electronic device.

By using the electronic device 300 and the data processing method 800 provided in the above embodiments of the present disclosure, the spectrum extension may be realized through a unified waveform transformation framework, thereby effectively reducing the PAPR. Furthermore, the interference between signals may be made smaller. In addition, according to another aspect of the present disclosure, the ratio of the M to the Q may be changed as required, and the double-side data deletion operation may be performed at the same time, thereby providing more diversified spectrum transformation possibilities to meet different requirements.

Hereinafter, an electronic device 900 according to an embodiment of the present disclosure will be described with reference to FIG. 9. FIG. 9 is a block diagram showing an electronic device 900 according to one embodiment of the present disclosure. In an embodiment of the present disclosure, the electronic device 900 may be a terminal device, such as a cellular phone, a smart phone, a portable computing device, a base station, a relay device, and the like. As shown in FIG. 9, the electronic device 900 includes an input unit 910 and a control unit 920. The electronic device 900 may also include other components (e.g., a storage unit for storing data, etc.), however, since these components have nothing to do with contents of embodiments of the present disclosure, their illustrations and descriptions are omitted here.

As shown in FIG. 9, the input unit 910 may obtain a first sequence including Q elements, the Q being an integer greater than 0. According to an example of the present disclosure, the first sequence may be a data sequence to be transmitted by the electronic device 900, or a combination of the data sequence and another sequence, for example, a combination of the data sequence and a sequence for at least one of NCP and UW.

The input unit 910 may obtain the first sequence from other units included in the electronic device 900 or may obtain the first sequence from other units independent of the electronic device 900.

The control unit 920 may perform a zero-padding operation and a discrete Fourier transformation (DFT) spreading operation on the first sequence to determine an extension sequence. The extension sequence may be a sequence in the frequency domain obtained by performing the DFT spreading on the first sequence after the zero-padding. Then, the control unit 920 may perform a double-side data deletion operation based on the extension sequence to determine a second sequence, wherein the second sequence includes M elements, the M being an integer greater than 0. As required, the value of M may be larger than or smaller than the value of Q, so the number of elements in the second sequence after the data deletion operation may be more or less than that in the first sequence which is initially input, thus, compared with the sequence obtained by directly performing the DFT spreading operation on the first sequence, the frequency band corresponding to each symbol in the second sequence is wider or narrower, thus realizing a flexible spectrum scaling mode. For example, in the case of less interference, M may be made smaller than Q, thereby compressing the spectrum used for the second sequence and improving the spectrum utilization rate. On the other hand, in the case of large interference, as described above in connection with FIGS. 3 to 8, M can be made larger than Q, thereby reducing the PAPR and interference between symbols.

According to an example of the present disclosure, when performing the DFT spreading operation, the control unit 920 may perform a N-point DFT spreading operation according to the zero embedding sequence to determine the extension sequence, where N is an integer multiple of M. After the DFT spreading, the control unit 920 may perform a double-side data deletion operation based on the extension sequence to determine a second sequence, wherein the second sequence includes M elements, the M being an integer greater than 0.

According to an example of the present disclosure, the ratio of the M to the Q (hereinafter also referred to as a scaling factor) may be preset. Alternatively, scaling information about the ratio of the M to the Q may also be received. Furthermore, according to another example of the present disclosure, the value of the M may be determined according to a transmission bandwidth of the electronic device 900, and the value of the Q may be determined according to the preset scaling factor. According to an example of the present disclosure, the electronic device 900 may further include a receiving unit 930 (as shown by the dashed box in FIG. 1). The receiving unit 930 may receive the scaling information. As an example, the scaling information may be notified to the electronic device 900 through any one of Radio Resource Control (RRC) signaling, MAC control element (MAC CE), Downlink Control Information (DCI), etc., so that the receiving unit of the electronic device 900 may receive the above scaling information. Compared with the preset ratio of the M to the Q, the control unit 920 may perform at least one of the zero-padding operation and the data deletion operation according to the scaling information, thereby performing a more flexible frequency scaling operation. In addition, when the ratio of M to Q is greater than 1, the scaling factor at this time is an extension factor, such as the extension factor described above with reference to the electronic device 300. When the ratio of M to Q is less than or equal to 1, the scaling factor at this time is a compression factor.

According to an example of the present disclosure, the scaling information may indicate information directly related to the scaling factor, for example, index information about the value of the scaling factor, a bitmap about the value of the scaling factor, and the like.

For example, the value of the scaling factor may be preset to 1.55. When the scaling information is received by the receiving unit 930, the control unit 920 may determine that the value of the scaling factor is 1.55. When the scaling information is not received by the receiving unit 930, the control unit 920 may determine the value of the scaling factor as a default value, and vice versa. In addition, the scaling information may also directly indicate the value of the scaling factor. For another example, the scaling information may also directly indicate that the value of the scaling factor is 1.25, 0.95, etc. As an example, the value of the scaling factor may be indicated by a fixed or configured RRC or MAC CE or DCI parameter (e.g., FTN-compressionfactor) in the communication standard. As another example, when the above RRC or MAC CE or DCI parameter (e.g., FTN-compressionfactor) is not configured, the electronic device 900 may directly set the value of the scaling factor as a default scaling factor value (e.g., 1).

For another example, a set of values of a scaling factor may be predefined. For example, the predefined set of values of the scaling factor may be {1.65, 1.55, 1.45, 1.35, 1.25, 1.15, 1.05, 1, 0.95, 0.85, 0.75, 0.65, 0.55}, where the index of the scaling factor 1.65 may be 0, and the index of the scaling factor 1.55 may be 1, the index of the scaling factor of 1.45 may be 2, and so on. Then, the index of the scaling factor to be used in the predefined set of values of the scaling factor is indicated by the RRC or MAC CE or DCI parameter (such as FTN-compressionfactor). For example, if the index of the scaling factor to be used in the predefined set of values of the scaling factor indicated by the parameter FTN-compressionfactor is 4, the value indicating the scaling factor to be used is 1.25. When the above RRC or MAC CE or DCI parameter (e.g., FTN-compressionfactor) is not configured, the electronic device 600 may directly set the value of the scaling factor as a default scaling factor value (e.g., 1).

As another example, two sets of values of scaling factors may be predefined. One set is for a case that the above ratio is greater than 1, that is, the scaling factor at this time is the extension factor; The other set is for a case that the above ratio is less than or equal to 1, that is, the scaling factor at this time is the compression factor. The third set for the case that the above ratio is greater than 1 may be {1.05, 1.1, 1.15, 1.2, 1.25, 1.3, 1.35, 1.4, 1.45, 1.5, 1.55, 1.6, 1.65, 1.7}, where the index of the scaling factor 1.05 may be 0, and the index of the scaling factor 1.1 may be 1, the index of scaling factor 1.15 may be 2, and so on. The fourth set for the case that the above ratio is less than or equal to 1 may be {0.95, 0.9, 0.85, 0.8, 0.75, 0.7, 0.65, 0.6, 0.55, 0.5, 0.45, 0.4, 0.35, 0.3}, where the index of the scaling factor 0.95 may be 0, the index of the scaling factor 0.9 may be 1, the index of the scaling factor 0.85 may be 2, and so on. Then the index of the scaling factor to be used in the third set is indicated by a parameter of RRC or MAC CE or DCI (for example, FTN-compressionfactorset). For example, if the index of the scaling factor to be used in the third set indicated by the parameter FTN-compressionfactorset is 4, the value of the scaling factor to be used is 1.25. The index of the scaling factor to be used in the fourth set is indicated by another parameter of the RRC or MAC CE or DCI (e.g., FTN-compressionfactor). For example, if the index of the scaling factor to be used in the fourth set indicated by the parameter FTN-compressionfactor is 5, the value of the scaling factor to be used is 0.7. When the above two parameters of the RRC or MAC CE or DCI are not configured, the electronic device 600 may directly set the value of the scaling factor as a default scaling factor value (for example, 1).

For another example, a bitmap may be predefined and a new field (such as FTNCompressionFactor) may be defined in the RRC or MAC CE or DCI to indicate the value of the scaling factor to be used. In addition, an existing field may also be used to indicate the value of the scaling factor to be used according to the actual situation.

As an example, a bitmap of the scaling factor may be obtained by extending a factor greater than 1 in an existing table of FTN compression factors in the standard, as shown in Table 6 below, in which the bold part is an extended factor greater than 1.

TABLE 6

| FTNCompressionFactor field | Scaling factor |
|---|---|
| 00000 | 1 |
| 00001 | 0.95 |
| 00010 | 0.9 |
| 00011 | 0.85 |
| 00100 | 0.8 |
| 00101 | 0.75 |
| 00110 | 0.7 |
| 00111 | 0.65 |

TABLE 6-continued

| FTNCompressionFactor field | Scaling factor |
|---|---|
| 01000 | 0.6 |
| 01001 | 0.55 |
| 01010 | 0.5 |
| 01011 | 0.45 |
| 01100 | 0.4 |
| 01101 | 0.35 |
| 01110 | 0.3 |
| 01111 | 1.05 |
| 10000 | 1.10 |
| 10001 | 1.15 |
| 10010 | 1.20 |
| 10011 | 1.25 |
| 10100 | 1.30 |
| 10101 | 1.35 |
| 10110 | 1.40 |
| 10111 | 1.45 |
| 11000 | 1.50 |
| 11001 | 1.55 |
| 11010 | 1.60 |
| 11011 | 1.65 |
| 11100 | 1.70 |

As another example, some values in an existing table of FTN compression factors in the standard may be replaced by factors greater than 1 to obtain a bitmap of the scaling factor, as shown in Table 7 below, in which the bold part is the replaced factors greater than 1.

TABLE 7

| FTNCompressionFactor field | a |
|---|---|
| 0000 | 1 |
| 0001 | 0.95 |
| 0010 | 1.05 |
| 0011 | 0.85 |
| 0100 | 1.15 |
| 0101 | 0.75 |
| 0110 | 1.25 |
| 0111 | 0.65 |
| 1000 | 1.35 |
| 1001 | 0.55 |
| 1010 | 1.45 |
| 1011 | 0.45 |
| 1100 | 1.55 |
| 1101 | 0.35 |
| 1110 | 1.65 |
| 1111 | — |

As another example, the bitmap of the scaling factor may be obtained by predefining a new table to indicate the scaling factors with values greater than or equal to 1, and combining the existing table of FTN compression factors with values less than 1 in the standard. Table 8 below shows the predefined new table of scaling factors with values greater than 1.

TABLE 8

| FTNCompressionFactor field | Scaling factor |
|---|---|
| 0000 | 1 |
| 0001 | 1.05 |
| 0010 | 1.10 |
| 0011 | 1.15 |
| 0100 | 1.20 |
| 0101 | 1.25 |
| 0110 | 1.30 |
| 0111 | 1.35 |

TABLE 8-continued

| FTNCompressionFactor field | Scaling factor |
|---|---|
| 1000 | 1.40 |
| 1001 | 1.45 |
| 1010 | 1.50 |
| 1011 | 1.55 |
| 1100 | 1.60 |
| 1101 | 1.65 |
| 1110 | 1.70 |
| 1111 | 1.75 |

Indicating the information directly related to the scaling factor through the scaling information may save the signaling overhead while realizing the flexible spectrum scaling.

Alternatively, the scaling information may indicate information about a scaling parameter. The processing unit 920 may determine the scaling factor through the scaling parameter. According to an example of the present disclosure, the scaling information may indicate at least one of a first scaling parameter and a second scaling parameter, wherein a ratio of the first scaling parameter to the second scaling parameter is equal to a ratio of M to Q. When the scaling information indicates one of the first scaling parameter and the second scaling parameter, the other of the first scaling parameter and the second scaling parameter is a default value. At this time, the ratio of the first scaling parameter to the second scaling parameter is the above scaling factor.

As an example, the first scaling parameter is set to b and the second scaling parameter is set to c. The values of b and c to be used may be indicated by two RRC or MAC CE or DCI parameters (e.g. FTN-b and FTN-c) (i.e. scaling information) fixed or configured in the communication standard. As another example, when the above two RRC or MAC CE or DCI parameters (e.g., FTN-b and FTN-c) are not configured, the electronic device 600 may directly set both b and c as default parameter values (e.g., 1). Similar to indicating information directly related to the scaling factor through the scaling information, the scaling information may directly indicate a value of at least one of the first scaling parameter and the second scaling parameter, or indicate index information, a bitmap, etc. about at least one of the first scaling parameter and the second scaling parameter.

For example, the second scaling parameter c may be a specific value predefined in the communication standard, and the first scaling parameter b may indicate the value of b to be used through a RRC or MAC CE or DCI parameter (e.g., FTN-b) (i.e., scaling information) configured in the communication standard. At this time, the value of b may be greater than the value of c or less than the value of c. As another example, when the above RRC or MAC CE or DCI parameter (e.g., FTN-b) is not configured, the electronic device 600 may directly set the value of b as a default value, such as the value of c.

For another example, the second extension parameter c may be a specific value predefined in the communication standard, such as 20. A set of values of the first scaling parameter b may be predefined in the electronic device 600. For example, the predefined set of values of the first scaling parameter b may be the fifth set {30, 29, 28, 27, 26, 25, 24, 23, 22, 21, 19, 18, 17, 16, 15, 14, 13, 12, 11, 10} where an index with a b value of 30 may be 0, an index with a b value of 29 may be 1, an index with a b value of 28 may be 2, and so on. Then, the index of b to be used in the predefined set of values of b is indicated by a RRC or MAC CE or DCI parameter (such as FTN-b). For example, if the index of b to be used in the predefined set of values of b indicated by the parameter FTN-b is 5, the value of b to be used is 25. When the above RRC or MAC CE or DCI parameter (e.g., FTN-b) is not configured, the electronic device 600 may directly set the value of b as a default value, such as the value of c.

For another example, the second extension parameter c may be a specific value predefined in the communication standard, such as 20. Two sets of values of the first scaling parameter b may be predefined in the electronic device 600. One set refers to a case that b is greater than c, for example, the set is a sixth set {30, 29, 28, 27, 26, 25, 24, 23, 22, 21}, where an index with a b value of 30 may be 0, an index with a b value of 29 may be 1, an index with a b value of 28 may be 2, and so on. In addition, the value of the index may also be other values that are convenient for interaction. The other set is for a case that b is less than 1, for example, the set is the seventh set {19, 18, 17, 16, 15, 14, 13, 12, 11, 10}, where the index with a b value of 19 may be 0, the index with a b value of 18 may be 1, the index with a b value of 17 may be 2, and so on. In addition, the value of the index may also be other values that are convenient for the interaction. Then, an index of b to be used in the sixth set is indicated by a parameter (e.g., FTN-bset) of the RRC or MAC CE or DCI. For example, if the index of b to be used in the above sixth set indicated by the parameter FTN-bset is 5, the value of b to be used is 25. The index of b to be used in the seventh set is indicated by another parameter (for example, FTN-b) of RRC or MAC CE or DCI. For example, if the index of b to be used in the seventh set indicated by the parameter FTN-b is 6, the value of b to be used is 13. When the above two parameters (e.g., FTN-bset and FTN-b) of the RRC or MAC CE or DCI are not configured, the electronic device 600 may directly set the value of b as a default value, such as the value of c.

As an example, if the first extension parameter is set to b and the second extension parameter is set to c, then the values of b and c may be indicated by two separate bitmaps. For example, the bitmap of c may be a table of existing values of c in the standard, as shown in Table 9 below.

TABLE 9

| FTNc field | c |
|---|---|
| 000 | 20 |
| 001 | 10 |
| 010 | 5 |
| 011 | 4 |
| 100 | 2 |
| 101 | 1 |

When the value indicated by the field FTNc in RRC or MAC CE or DCI is 010, the value of c indicated at this time is 5.

At this time, as an example, the bitmap of b may be obtained by extending a table of existing values of b in the standard. When extending, especially the values greater than the value of c shown in Table 9 is extended, as shown in Table 10 below, in which the extended value is shown in bold.

TABLE 10

| FTNb field | b |
|---|---|
| 0000 | 29 |
| 0001 | 27 |

TABLE 10-continued

| FTNb field | b |
|---|---|
| 0010 | 25 |
| 0011 | 23 |
| 0100 | 21 |
| 0101 | 19 |
| 0110 | 17 |
| 0111 | 13 |
| 1000 | 11 |
| 1001 | 9 |
| 1010 | 7 |
| 1011 | 6 |
| 1100 | 4 |
| 1101 | 3 |
| 1110 | 2 |
| 1111 | 1 |

Then when the value indicated by the existing or predefined new field FTNb in RRC or MAC CE or DCI is 0100, the value of b indicated at this time is 21.

As another example, the bitmap of b may be obtained by replacing some values in a table of existing values of b in the standard. When replacing, it is especially necessary to replace with a value greater than the value of c shown in Table 9, as shown in Table 11 below, in which the replaced value is shown in bold.

TABLE 11

| FTNb field | b |
|---|---|
| 0000 | 19 |
| 0001 | 17 |
| 0010 | 13 |
| 0011 | 11 |
| 0100 | 21 |
| 0101 | 23 |
| 0110 | 25 |
| 0111 | 3 |
| 1000 | 27 |
| 1001 | 1 |

When the value indicated by the existing or predefined new field FTNb in RRC or MAC CE or DCI is 0110, the value of b indicated at this time is 25.

As another example, the value of b may be indicated by predefining a new table, as shown in Table 12 below.

TABLE 12

| FTNb field | b |
|---|---|
| 0000 | 29 |
| 0001 | 27 |
| 0010 | 25 |
| 0011 | 23 |
| 0100 | 21 |
| 0101 | 13 |
| 0110 | 11 |
| 0111 | 7 |
| 1000 | 6 |
| 1001 | 3 |
| 1010 | 1 |

When the value indicated by the existing or predefined new field FTNb in RRC or MAC CE or DCI is 1001, the value of b indicated at this time is 3.

In an embodiment of the present disclosure, the values of b and c may be jointly indicated based on one bitmap.

As an example, the tables of b and c in the existing standard may be extended to get the bitmap of b and c, as shown in Table 13. When extending, the extending focuses on a case that b is greater than c. The bold in Table 13 indicates the extended part.

TABLE 13

| FTNCbc field | b | c |
|---|---|---|
| 00000 | 1 | 1 |
| 00001 | 19 | 20 |
| 00010 | 9 | 10 |
| 00011 | 17 | 20 |
| 00100 | 4 | 5 |
| 00101 | 3 | 4 |
| 00110 | 7 | 10 |
| 00111 | 13 | 20 |
| 01000 | 3 | 5 |
| 01001 | 11 | 20 |
| 01010 | 1 | 2 |
| 01011 | 9 | 20 |
| 01100 | 2 | 5 |
| 01101 | 7 | 20 |
| 01110 | 3 | 10 |
| 01111 | 21 | 20 |
| 10000 | 11 | 10 |
| 10001 | 23 | 20 |
| 10010 | 6 | 5 |
| 10011 | 25 | 20 |
| 10100 | 13 | 10 |
| 10101 | 27 | 20 |
| 10110 | 7 | 5 |
| 10111 | 29 | 20 |
| 11000 | 3 | 2 |

When the value indicated by the existing or predefined new field FTNCbc in RRC or MAC CE or DCI is 10110, it means that the indicated value of b is 7 and the indicated value of c is 5 at this time.

As another example, the table of b and c in the existing standard may be replaced to obtain the bitmap of b and c, as shown in Table 14. When making the replacement, the replacement focuses on a case that b is greater than c. Bold in Table 14 indicates the replaced parts.

TABLE 14

| FTNCbc field | b | c |
|---|---|---|
| 0000 | 1 | 1 |
| 0001 | 19 | 20 |
| 0010 | 21 | 20 |
| 0011 | 17 | 20 |
| 0100 | 23 | 20 |
| 0101 | 3 | 4 |
| 0110 | 25 | 20 |
| 0111 | 13 | 20 |
| 1000 | 27 | 20 |
| 1001 | 11 | 20 |
| 1010 | 29 | 20 |
| 1011 | 9 | 20 |
| 1100 | 31 | 20 |
| 1101 | 7 | 20 |
| 1110 | 33 | 20 |
| 1111 | — | — |

When the value indicated by the existing or predefined new field FTNCbc in the RRC or MAC CE or DCI is 1100, it means that the indicated value of b is 31 and the indicated value of c is 20 at this time.

As another example, a new table indicating the values of b and c may be predefined to obtain the bitmap of b and c, as shown in Table 15.

TABLE 15

| FTNCbc field | b | c |
|---|---|---|
| 0000 | 1 | 1 |
| 0001 | 21 | 20 |
| 0010 | 11 | 10 |
| 0011 | 23 | 20 |
| 0100 | 6 | 5 |
| 0101 | 25 | 20 |
| 0110 | 13 | 10 |
| 0111 | 27 | 20 |
| 1000 | 7 | 5 |
| 1001 | 29 | 20 |
| 1010 | 3 | 2 |
| 1011 | 31 | 20 |
| 1100 | 8 | 5 |
| 1101 | 33 | 20 |
| 1110 | 17 | 10 |
| 1111 | — | — |

When the value indicated by the existing or predefined new field FTNCbc in the RRC or MAC CE or DCI is 1110, it means that the indicated value of b is 17 and the indicated value of c is 10 at this time.

In addition, the above scaling factor may be set to a. As mentioned above, the $\alpha$ may be set to be $$\alpha = \frac{M}{Q}.$$

In addition, the $\alpha$ may also be set to be $$\alpha = \frac{b}{c},$$

b and c are positive integers and b may be greater than c, less than c or equal to c. As described below, the first scaling parameter b and the second scaling parameter c may be used for the zero-padding operation, the DFT spreading and the data deletion operation. For example, the b may be related to the number of zeros filled in the zero-padding operation. The c may be related to the number of DFT spreading subsets described below, and it may also be related to the number of sampling points of DFT spreading sets. Therefore, compared with indicating the information directly related to the scaling factor through the scaling information, indicating the information about the scaling parameters through the scaling information may require more signaling overhead, but it is not necessary to determine the b and the c respectively according to the scaling factor, thus simplifying the operation of the electronic device.

The control unit 920 may perform a double-side data deletion operation based on the extension sequence by, for example, a method similar to that in connection with FIGS. 6A and 7A. And in this embodiment, the ratio of M to Q and related information and parameters (such as the scaling information, the scaling factor and the scaling parameter, etc.) may be set as required. The examples of performing a double-side data deletion operation based on the extension sequence to determine the second sequence have been described above with reference to FIGS. 6A and 7A, so they are not repeated here.

In addition, according to an example of the present disclosure, the control unit 920 may also perform subcarrier mapping and inverse discrete Fourier transformation according to the second sequence to determine a sequence to be transmitted. For example, in the example shown in FIG. 2, a subcarrier mapping operation, an inverse discrete Fourier transformation (IFFT) operation, a parallel/serial conversion operation and the like are sequentially performed on the second sequence $X=[X_0 \ldots X_i \ldots X_{M-1}]^T$ to determine the sequence to be transmitted.

In addition, according to an example of the present disclosure, the control unit 920 may also perform the parallel-serial conversion operation and cyclic prefix insertion (CP insertion) based on the sequence to be transmitted according to a specific situation. The control unit 920 may also perform a serial-parallel operation on a data sequence of the first sequence as an input before the zero-padding operation according to a specific situation, so as to facilitate the zero-padding operation.

According to another example of the present disclosure, the electronic device 900 may further include a transmitting unit (not shown), which may be configured to transmit capability information indicating a scaling capability supported by the electronic device. The electronic device 900 may transmit capability information about the scaling capability supported by the electronic device through RRC or MAC CE or Uplink Control Information (UCI). Thus, in the case where the electronic device 900 is, for example, a terminal device, a network-side device (for example, a base station) may transmit appropriate extension information to the electronic device 900, according to the electronic device 900. By transmitting the capability information indicating the scaling capability supported by the electronic device, it may be possible for the network-side device to transmit resources corresponding to the capability information of the scaling capability supported by the electronic device to the electronic device, thereby saving resources of a whole system including the electronic device.

As an example, the capability information may indicate at least one of a compression capability or an extension capability supported by the electronic device 900, wherein the supported compression capability may refer to a case that the scaling factor is less than 1, and the supported extension capability may refer to a case that the scaling factor is greater than 1. By transmitting an indication about at least one of the compression capability or the extension capability supported by the electronic device, it is possible for the network-side device to transmit resources corresponding to the compression capability or the extension capability supported by the electronic device to the electronic device, thereby further saving the resources of the whole system including the electronic device, while further saving resources such as calculation and storage etc. of the electronic device.

The electronic device 900 may transmit the above capability information through predefined capability signaling, and the capability signaling may be the same or different in different frequency bands. According to an actual situation, the electronic device 900 may also not transmit the above capability information in a default case. At this time, according to the actual situation, it may mean that the electronic device 900 supports the operations related to the above scaling factor by default, or it may mean that the electronic device 900 does not support the operations related to the above extension factor by default, or it may mean that the electronic device 900 only supports operations related to one of compression capability or extension capability by default. In addition, alternatively, the electronic device 900 may selectively transmit the above capability information according to the actual situation.

In an embodiment of the present disclosure, the capability information may indicate the capability information of the scaling capability supported by the electronic device for a specific frequency band. As an example, the electronic device 900 may transmit the above capability information separately for different frequency bands, or transmit the above capability information together for different frequency bands. For example, the electronic device 900 may separately transmit whether or not the related capability information is supported or separately transmit the supported related capability information for different frequency bands. For another example, the electronic device 900 may transmit whether or not the related capability information is supported or transmit the supported related capability information together for different frequency bands.

In the embodiment of the present disclosure, the electronic device 900 may receive the scaling information and perform the zero-padding operation, the discrete Fourier transformation spreading operation, and the double-side data deletion operation after transmitting the capability information. That is, the scaling information may be determined according to the capability information. As an example, when the electronic device 900 transmits the capability information that it only supports the above-mentioned extension capability, the network-side device may only transmit the scaling information indicating the scaling factor greater than 1 to the electronic device 900, so that only resources related to the scaling factor greater than 1 are used between the electronic device 900 and the network-side device.

Therefore, by performing the zero-padding operation on the first sequence including Q time domain symbol elements before the DFT spreading operation and performing the double-side data deletion operation after the DFT spreading operation, it is possible to easily realize that a good compatibility with the existing improved scheme based on the DFT-s-OFDM is realized on the basis of the existing scheme compatible with improved schemes based on DFT-s-OFDM, in a simple way, and the frequency band may be flexibly transformed as required.

Next, a data processing method according to an embodiment of the present disclosure will be described with reference to FIG. 10.

Hereinafter, FIG. 10 is a flowchart showing a data processing method 1000 executed by the electronic device 900 according to one embodiment of the present disclosure. Since the steps of the data processing method 1000 executed by the electronic device 900 correspond to the operations of the electronic device 900 described above, a detailed description of the same content is omitted here for the sake of simplicity.

As shown in FIG. 10, the data processing method 1000 executed by the electronic device 900 includes an input step S1010 and a processing step S1020.

Specifically, in the example shown in FIG. 10, in the input step S1010, it is configured to obtain a first sequence including Q elements, the Q being an integer greater than 0. According to an example of the present disclosure, the first sequence may be a data sequence to be transmitted, or a combination of the data sequence and another sequence, for example, a combination of the data sequence and a sequence for at least one of NCP and UW.

The first sequence may be obtained from other units included in the electronic device 900 or may be obtained from other units independent of the electronic device 900.

The processing step may perform a zero-padding operation and a discrete Fourier transformation (DFT) spreading operation on the first sequence to determine an extension sequence. The extension sequence may be a sequence in the frequency domain obtained by performing the DFT spreading on the first sequence after the zero-padding. Then, a double-side data deletion operation may be perform based on the extension sequence to determine a second sequence, wherein the second sequence includes M elements, the M being an integer greater than 0. Because the value of M may be larger than or smaller than the value of Q according to an actual scene, the number of elements in the second sequence after the data deletion operation may be more or less than that in the first sequence which is initially input, and thus, compared with the sequence obtained by directly performing the DFT spreading operation on the first sequence, the frequency band corresponding to each symbol in the second sequence is wider or narrower, thus realizing a flexible spectrum scaling mode.

According to an example of the present disclosure, when performing the DFT spreading operation, the processing step may perform a N-point DFT spreading operation according to the zero embedding sequence to determine the extension sequence, where N is an integer multiple of M. After the DFT spreading, the processing step may perform a double-side data deletion operation based on the extension sequence to determine a second sequence, wherein the second sequence includes M elements, the M being an integer greater than 0.

According to an example of the present disclosure, the ratio of the M to the Q (hereinafter also referred to as a scaling factor) may be preset. Alternatively, scaling information about the ratio of the M to the Q may also be received. Furthermore, according to another example of the present disclosure, the value of the M may be determined according to a transmission bandwidth of the electronic device 900, and the value of the Q may be determined according to the preset scaling factor.

According to an example of the present disclosure, the data processing method 1000 may further include receiving scaling information. As an example, the scaling information may be notified to the electronic device 900 through any one of Radio Resource Control (RRC) signaling, MAC control element (MAC CE), Downlink Control Information (DCI), etc., so that the above scaling information may be received in the receiving step. Compared with the preset ratio of the M to the Q, the processing step may perform at least one of the zero-padding operation and the data deletion operation according to the scaling information, thereby performing a more flexible frequency scaling operation. In addition, when the ratio of M to Q is greater than 1, the scaling factor at this time is an extension factor, such as the extension factor described above with reference to the electronic device 300. When the ratio of M to Q is less than or equal to 1, the scaling factor at this time is a compression factor.

According to an example of the present disclosure, the scaling information may indicate information directly related to the scaling factor, for example, index information about the value of the scaling factor, a bitmap about the value of the scaling factor, and the like.

Indicating the information directly related to the scaling factor through the scaling information may save the signaling overhead while realizing the flexible spectrum scaling.

According to an example of the present disclosure, the data processing method 1000 may further include transmitting capability information indicating a scaling capability supported by the electronic device.

Alternatively, the scaling information may indicate information about a scaling parameter. The processing step may determine the scaling factor through the scaling parameter.

According to an example of the present disclosure, the scaling information may indicate at least one of a first scaling parameter and a second scaling parameter, wherein a ratio of the first scaling parameter to the second scaling parameter is equal to a ratio of M to Q. When the scaling information indicates one of the first scaling parameter and the second scaling parameter, the other of the first scaling parameter and the second scaling parameter is a default value. At this time, the ratio of the first scaling parameter to the second scaling parameter is the above scaling factor.

As an example, the first scaling parameter is set to b and the second scaling parameter is set to c. The values of b and c to be used may be indicated by two RRC or MAC CE or DCI parameters (e.g. FTN-b and FTN-c) (i.e. scaling information) fixed or configured in the communication standard. As another example, when the above two RRC or MAC CE or DCI parameters (e.g., FTN-b and FTN-c) are not configured, the electronic device 600 may directly set both b and c as default parameter values (e.g., 1). Similar to indicating information directly related to the scaling factor through the scaling information, the scaling information may directly indicate a value of at least one of the first scaling parameter and the second scaling parameter, or indicate index information, a bitmap, etc. about at least one of the first scaling parameter and the second scaling parameter.

For example, the second scaling parameter c may be a specific value predefined in the communication standard, and the first scaling parameter b may indicate the value of b to be used through a RRC or MAC CE or DCI parameter (e.g., FTN-b) (i.e., scaling information) configured in the communication standard. At this time, the value of b may be greater than the value of c or less than the value of c. As another example, when the above RRC or MAC CE or DCI parameter (e.g., FTN-b) is not configured, the electronic device 900 may directly set the value of b as a default value, such as the value of c.

For another example, the second extension parameter c may be a specific value predefined in the communication standard, such as 20. A set of values of the first scaling parameter b may be predefined in the electronic device 900. Then, the index of b to be used in the predefined set of values of b is indicated by a RRC or MAC CE or DCI parameter (such as FTN-b). When the above RRC or MAC CE or DCI parameter (e.g., FTN-b) is not configured, the electronic device 900 may directly set the value of b as a default value, such as the value of c.

For another example, the second extension parameter c may be a specific value predefined in the communication standard, such as 20. Two sets of values of the first scaling parameter b may be predefined in the electronic device 600, wherein one set is for a case that b is greater than c and the other set is for a case that b is less than 1.

As an example, if the first extension parameter is set to b and the second extension parameter is set to c, then the values of b and c may be indicated by two separate bitmaps. As an example, the bitmap of b may be obtained by extending a table of existing values of b in the standard. As another example, the bitmap of b may be obtained by replacing some values in a table of existing values of b in the standard.

In an embodiment of the present disclosure, the values of b and c may be jointly indicated based on one bitmap. As another example, the table of b and c in the existing standard may be replaced to obtain the bitmap of b and c. As another example, a new table indicating the values of b and c may be predefined to obtain the bitmap of b and c.

In addition, the above scaling factor may be set to a. As mentioned above, the $\alpha$ may be set to be $$\alpha = \frac{M}{Q}.$$

In addition, the $\alpha$ may also be set to be $$\alpha = \frac{b}{c},$$

b and c are positive integers and b may be greater than c, less than c or equal to c. As described below, the first scaling parameter b and the second scaling parameter c may be used for the zero-padding operation, the DFT spreading and the data deletion operation. For example, the b may be related to the number of zeros filled in the zero-padding operation. The c may be related to the number of DFT spreading subsets described above, and it may also be related to the number of sampling points of DFT spreading sets. Therefore, compared with indicating the information directly related to the scaling factor through the scaling information, indicating the information about the scaling parameters through the scaling information may require more signaling overhead, but it is not necessary to determine the b and the c respectively according to the scaling factor, thus simplifying the operation of the electronic device <Hardware Structure>

In addition, block diagrams used in the description of the above embodiments illustrate blocks in units of functions. These functional blocks (structural blocks) may be implemented in arbitrary combination of hardware and/or software. Furthermore, means for implementing respective functional blocks is not particularly limited. That is, the respective functional blocks may be implemented by one apparatus that is physically and/or logically jointed; or more than two apparatuses that are physically and/or logically separated may be directly and/or indirectly connected (e.g. wired and/or wirelessly), and the respective functional blocks may be implemented by these apparatuses.

For example, a device (for example, the electronic devices 300 and 900, a terminal and a base station, etc.) of an embodiment of the present disclosure may function as a computer that executes the processes of the data processing method of the present disclosure. FIG. 11 is a schematic diagram showing a hardware structure of a device 1100 involved according to an embodiment of the present disclosure. The above device 1100 may be constituted as a computer apparatus that physically comprises a processor 1110, a memory 1120, a storage 1130, a communication apparatus 1140, an input apparatus 1150, an output apparatus 1160, a bus 1170 and the like.

In addition, in the following description, terms such as "apparatus" may be replaced with circuits, devices, units, and the like. The hardware structure of the terminal may include one or more of the respective apparatuses shown in the figure, or may not include a part of the apparatuses.

For example, only one processor 1110 is illustrated, but there may be multiple processors. Furthermore, processes may be performed by one processor, or processes may be performed by more than one processor simultaneously, sequentially, or with other methods. In addition, the processor 1110 may be installed by more than one chip.

Respective functions of any of the device 1100 may be implemented, for example, by reading specified software (program) on hardware such as the processor 1110 and the memory 1120, so that the processor 1110 performs computations, controls communication performed by the communication apparatus 1140, and controls reading and/or writing of data in the memory 1120 and the storage 1130.

The processor 1110, for example, operates an operating system to control the entire computer. The processor 1110 may be constituted by a Central Processing Unit (CPU), which includes interfaces with peripheral apparatuses, a control apparatus, a computing apparatus, a register and the like. For example, the control unit and so on described above may be implemented by the processor 1110.

In addition, the processor 1110 reads programs (program codes), software modules and data and the like from the storage 1130 and/or the communication apparatus 1140 to the memory 1120, and executes various processes according to them. As for the program, a program causing computers to execute at least a part of the operations described in the above embodiments may be employed. For example, the control unit of the terminal may be implemented by a control program stored in the memory 1120 and operated by the processor 1110. Other functional blocks may also be implemented similarly.

The memory 1120 is a computer-readable recording medium. For example, the memory may be constituted, for example, by at least one of a Read Only Memory (ROM), an Erasable Programmable ROM (EPROM), an Electrically EPROM (EEPROM), a Random Access Memory (RAM) and other appropriate storage media. The memory 1120 may also be referred to as a register, a cache, a main memory (a main storage apparatus) and the like. The memory 1120 may store executable programs (program codes), software modules and the like for implementing a method involved in an embodiment of the present disclosure.

The storage 1130 is a computer-readable recording medium. For example, the storage may be constituted, for example, by at least one of a flexible disk, a Floppy® disk, a magneto-optical disk (e.g., a Compact Disc ROM (CD-ROM) and the like, a digital versatile disk, a Blu-ray® disk), a removable disk, a hard driver, a smart card, a flash memory device (e.g., a card, a stick and a key driver), a magnetic stripe, a database, a server, and other appropriate storage media. The storage 1130 may also be referred to as an auxiliary storage apparatus.

The communication apparatus 1140 is a hardware (transceiver device) performing communication between computers via a wired and/or wireless network. For example, the communication apparatus is also referred to as a network device, a network controller, a network card, a communication module and the like. The communication apparatus 1140 may include a high-frequency switch, a duplexer, a filter, a frequency synthesizer and the like to implement, for example, Frequency Division Duplex (FDD) and/or Time Division Duplex (TDD). For example, the transmitting unit, the receiving unit and the like described above may be implemented by the communication apparatus 1140.

The input apparatus 1150 is an input device (e.g., a keyboard, a mouse, a microphone, a switch, a button, a sensor and the like) that receives input from the outside. The output apparatus 1160 is an output device (e.g., a display, a speaker, a Light Emitting Diode (LED) light and the like) that performs outputting to the outside. In addition, the input apparatus 1150 and the output apparatus 1160 may also be an integrated structure (e.g., a touch panel).

Furthermore, the respective apparatuses such as the processor 1110 and the memory 1120 are connected by the bus 1170 that communicates information. The bus 1170 may be constituted by a single bus or by different buses between the apparatuses.

Furthermore, the terminal may comprise hardware such as a microprocessor, a Digital Signal Processor (DSP), an Application Specified Integrated Circuit (ASIC), a Programmable Logic Device (PLD), a Field Programmable Gate Array (FPGA) and so on. The terminal may implement a part of or all of the respective functional blocks by these hardware. For example, the processor 1110 may be installed by at least one of these hardware.

(Variations)

In addition, terms illustrated in the present specification and/or terms required for understanding of the present specification may be substituted with terms having the same or similar meaning. For example, a channel and/or a symbol may also be a signal (signaling). Furthermore, the signal may be a message. A reference signal may be abbreviated as an "RS". The reference signal may also be referred to as a pilot, a pilot signal and so on, depending on the standard applied. Furthermore, a component carrier (CC) may also be referred to as a cell, a frequency carrier, a carrier frequency, and the like.

Furthermore, information, parameters and so on described in this specification may be represented in absolute values or in relative values with respect to specified values, or may be represented by other corresponding information. For example, radio resources may be indicated by specified indexes. Furthermore, formulas and the like using these parameters may be different from those explicitly disclosed in this specification.

Names used for parameters and the like in this specification are not limited in any respect. For example, various channels (Physical Uplink Control Channels (PUCCHs), Physical Downlink Control Channels (PDCCHs), etc.) and information elements may be identified by any suitable names. Thus, the various names assigned to these various channels and information elements are not limitative in any respect.

Information, signals and the like described in this specification may be represented by using any of a variety of different technologies. For example, data, instructions, commands, information, signals, bits, symbols, chips, etc. possibly referenced throughout the above description may be represented by voltages, currents, electromagnetic waves, magnetic fields or particles, optical fields or photons, or any combination thereof.

In addition, information, signals and the like may be output from higher layers to lower layers and/or from lower layers to higher layers. Information, signals and the like may be input or output via a plurality of network nodes.

Information, signals and the like that are input or output may be stored in a specific location (for example, in a memory), or may be managed in a management table. Information, signals and the like that are input or output may be overwritten, updated or appended. Information, signals and the like that are output may be deleted. Information, signals and the like that are input may be transmitted to other apparatuses.

Reporting of information is by no means limited to the manners/embodiments described in this specification, and may be implemented by other methods as well. For example, reporting of information may be implemented by using physical layer signaling (for example, Downlink Control Information (DCI), Uplink Control Information (UCI)), higher layer signaling (for example, Radio Resource Control (RRC) signaling, broadcast information (Master Information Blocks (MIBs), System Information Blocks (SIBs), etc.), Medium Access Control (MAC) signaling), other signals or combinations thereof.

In addition, physical layer signaling may also be referred to as L1/L2 (Layer 1/Layer 2) control information (L1/L2 control signals), L1 control information (L1 control signal) and the like. Furthermore, RRC signaling may also be referred to as RRC message. For example, the RRC signaling may be RRC connection setup message, RRC connection reconfiguration message, and so on. Furthermore, MAC signaling may be reported by using, for example, MAC Control Elements (MAC CEs).

Furthermore, notification of prescribed information (for example, notification of "being X") is not limited to being performed explicitly, and may be performed implicitly (for example, by not performing notification of the prescribed information or by notification of other information).

Decision may be performed by a value (0 or 1) represented by 1 bit, or by a true or false value (Boolean value) represented by TRUE or FALSE, or by a numerical comparison (e.g., comparison with a prescribed value).

Software, whether referred to as "software", "firmware", "middleware", "microcode" or "hardware description language", or called by other names, should be interpreted broadly to mean instructions, instruction sets, codes, code segments, program codes, programs, subprograms, software modules, applications, software applications, software packages, routines, subroutines, objects, executable files, execution threads, procedures, functions and so on.

In addition, software, commands, information, etc. may be transmitted and received via a transport medium. For example, when software is transmitted from web pages, servers or other remote sources using wired technologies (coaxial cables, fibers, twisted pairs, Digital Subscriber Lines (DSLs), etc.) and/or wireless technologies (infrared ray, microwave, etc.), these wired technologies and/or wireless technologies are included in the definition of the transport medium.

In this specification, terms like "Base Station (BS)", "wireless base station", "eNB", "gNB", "cell", "sector", "cell group", "carrier" and "component carrier" may be used interchangeably. A base station is sometimes referred to as terms such as a fixed station, a NodeB, an eNodeB (eNB), an access point, a transmitting point, a receiving point, a femto cell, a small cell and the like.

A base station is capable of accommodating one or more (for example, three) cells (also referred to as sectors). In the case where the base station accommodates a plurality of cells, the entire coverage area of the base station may be divided into a plurality of smaller areas. Each smaller area may provide communication services by using a base station sub-system (for example, a small base station for indoor use (a Remote Radio Head (RRH)). Terms like "cell" and "sector" refer to a part of or an entirety of the coverage area of a base station and/or a sub-system of the base station that provides communication services in this coverage.

In this specification, terms such as "Mobile Station (MS)", "user terminal", "User Equipment (UE)", and "terminal" may be used interchangeably. The mobile station is sometimes referred by those skilled in the art as a user station, a mobile unit, a user unit, a wireless unit, a remote unit, a mobile device, a wireless device, a wireless communication device, a remote device, a mobile user station, an access terminal, a mobile terminal, a wireless terminal, a remote terminal, a handset, a user agent, a mobile client, a client, or some other appropriate terms.

Furthermore, the wireless base station in this specification may also be replaced with a user terminal. For example, for a structure in which communication between a wireless base station and a user terminal is replaced with communication between a plurality of user terminals (Device-to-Device, D2D), the respective manners/embodiments of the present disclosure may also be applied. In this case, functions provided by a first communication device or a second communication device in the device 1100 described above may be regarded as functions provided by a user terminal. Furthermore, the words "uplink" and "downlink" may also be replaced with "side". For example, an uplink channel may be replaced with a side channel.

Also, the user terminal in this specification may be replaced with the wireless base station. In this case, functions provided by the above user terminal may be regarded as functions provided by a first communication device or a second communication device.

In this specification, specific actions configured to be performed by the base station sometimes may be performed by its upper nodes in certain cases. Obviously, in a network composed of one or more network nodes having base stations, various actions performed for communication with terminals may be performed by the base stations, one or more network nodes other than the base stations (for example, Mobility Management Entities (MMEs), Serving-Gateways (S-GWs), etc., may be considered, but not limited thereto)), or combinations thereof.

The respective manners/embodiments described in this specification may be used individually or in combinations, and may also be switched to use during execution. In addition, orders of processes, sequences, flow charts and so on of the respective manners/embodiments described in this specification may be re-ordered as long as there is no inconsistency. For example, although various methods have been described in this specification with various units of steps in exemplary orders, the specific orders as described are by no means limitative.

The manners/embodiments described in this specification may be applied to systems that utilize Long Term Evolution (LTE), Advanced Long Term Evolution (LTE-A, LTE-Advanced), Beyond Long Term Evolution (LTE-B, LTE-Beyond), the super 3rd generation mobile communication system (SUPER 3G), Advanced International Mobile Telecommunications (IMT-Advanced), the 4th generation mobile communication system (4G), the 5th generation mobile communication system (5G), Future Radio Access (FRA), New Radio Access Technology (New-RAT), New Radio (NR), New radio access (NX), Future generation radio access (FX), Global System for Mobile communications (GSMR), Code Division Multiple Access 3000 (CDMA 3000), Ultra Mobile Broadband (UMB), IEEE 802.11 (Wi-Fi®), IEEE 802.16 (WiMAX®), IEEE 802.20, Ultra-Wide Band (UWB), Bluetooth® and other appropriate wireless communication methods, and/or next-generation systems that are enhanced based on them.

Terms such as "based on" as used in this specification do not mean "based on only", unless otherwise specified in other paragraphs. In other words, terms such as "based on" mean both "based on only" and "at least based on."

Any reference to units with designations such as "first", "second" and so on as used in this specification does not generally limit the quantity or order of these units. These designations may be used in this specification as a convenient method for distinguishing between two or more units.

Therefore, reference to a first unit and a second unit does not imply that only two units may be employed, or that the first unit must precedes the second unit in several ways.

Terms such as "deciding (determining)" as used in this specification may encompass a wide variety of actions. The "deciding (determining)" may regard, for example, calculating, computing, processing, deriving, investigating, looking up (e.g., looking up in a table, a database or other data structures), ascertaining, etc. as performing the "deciding (determining)". In addition, the "deciding (determining)" may also regard receiving (e.g., receiving information), transmitting (e.g., transmitting information), inputting, outputting, accessing (e.g., accessing data in a memory), etc. as performing the "deciding (determining)". In addition, the "deciding (determining)" may further regard resolving, selecting, choosing, establishing, comparing, etc. as performing the "deciding (determining)". That is, the "deciding (determining)" may regard certain actions as performing the "deciding (determining)".

As used herein, terms such as "connected", "coupled", or any variation thereof mean any direct or indirect connection or coupling between two or more units, and may include the presence of one or more intermediate units between two units that are "connected" or "coupled" to each other. Coupling or connection between the units may be physical, logical or a combination thereof. For example, "connection" may be replaced with "access." As used in this specification, two units may be considered as being "connected" or "coupled" to each other by using one or more electrical wires, cables and/or printed electrical connections, and, as a number of non-limiting and non-inclusive examples, by using electromagnetic energy having wavelengths in the radio frequency region, microwave region and/or optical (both visible and invisible) region.

When terms such as "including", "comprising" and variations thereof are used in this specification or the claims, these terms, similar to the term "having", are also intended to be inclusive. Furthermore, the term "or" as used in this specification or the claims is not an exclusive or.

Although the present disclosure has been described above in detail, it should be obvious to a person skilled in the art that the present disclosure is by no means limited to the embodiments described in this specification. The present disclosure may be implemented with various modifications and alterations without departing from the spirit and scope of the present disclosure defined by the recitations of the claims. Consequently, the description in this specification is for the purpose of illustration, and does not have any limitative meaning to the present disclosure.

The invention claimed is:

1. An electronic device comprising:
a processor configured to:
obtain a first sequence comprising Q elements, the Q being an integer greater than 0; and
perform a zero-padding operation and a discrete Fourier transformation spreading operation on the first sequence to determine an extension sequence, and perform a double-side data deletion operation based on the extension sequence to determine a second sequence, wherein the second sequence comprises M elements, the M being an integer greater than 0; and
a receiver configured to receive scaling information,
wherein the processor performs at least one of the zero-padding operation and the deletion operation according to the scaling information, and
wherein the electronic device is a terminal device and the electronic device further comprises a transmitter configured to transmit capability information indicating a scaling capability supported by the electronic device.

2. The electronic device according to claim 1, wherein the capability information indicates at least one of a compression capability or an extension capability supported by the electronic device.

3. A data processing method, comprising:
configured processing to:

obtain a first sequence comprising Q elements, the Q being an integer greater than 0; and perform a zero-padding operation and a discrete Fourier transformation spreading operation on the first sequence to determine an extension sequence, and perform a double-side data deletion operation based on the extension sequence to determine a second sequence, wherein the second sequence comprises M elements, the M being an integer greater than 0; and receiving scaling information, wherein the processing is configured to perform at least one of the zero-padding operation and the deletion operation according to the scaling information, and wherein the data processing method further comprises transmitting capability information indicating a scaling capability supported by a terminal device.

\*   \*   \*   \*   \*